US008157039B2

(12) United States Patent
Melvin et al.

(10) Patent No.: US 8,157,039 B2
(45) Date of Patent: Apr. 17, 2012

(54) VEHICLE

(75) Inventors: Timothy F. Melvin, North Branch, MN (US); Robbi L. Peterson, Middle River, MN (US); Steven D. Corneliusen, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 346 days.

(21) Appl. No.: 12/317,298

(22) Filed: Dec. 22, 2008

(65) Prior Publication Data
US 2010/0155170 A1  Jun. 24, 2010

(51) Int. Cl.
*B60K 13/00* (2006.01)

(52) U.S. Cl. .................. 180/68.2; 180/68.1

(58) Field of Classification Search ............. 180/68.1, 180/68.2, 38.3, 229, 230, 231, 339
See application file for complete search history.

(56) References Cited

U.S. PATENT DOCUMENTS

| | | | |
|---|---|---|---|
| 3,861,229 A | 1/1975 | Domaas | |
| 4,712,629 A * | 12/1987 | Takahashi et al. | 180/68.1 |
| 6,120,399 A | 9/2000 | Okeson et al. | |
| 6,176,796 B1 | 1/2001 | Lislegard | |
| 6,860,826 B1 | 3/2005 | Johnson | |
| 6,938,508 B1 | 9/2005 | Saagge | |
| 7,055,454 B1 | 6/2006 | Whiting et al. | |
| 7,147,075 B2 | 12/2006 | Tanaka et al. | |
| 7,287,619 B2 | 10/2007 | Tanaka et al. | |
| D555,036 S | 11/2007 | Eck | |
| 7,367,417 B2 | 5/2008 | Inui et al. | |
| 7,438,147 B2 | 10/2008 | Kato et al. | |
| 7,490,694 B1 * | 2/2009 | Berg et al. | 180/326 |
| 2004/0195019 A1 * | 10/2004 | Kato et al. | 180/68.3 |
| 2004/0195034 A1 | 10/2004 | Kato et al. | |
| 2006/0006010 A1 * | 1/2006 | Nakamura et al. | 180/68.1 |
| 2007/0215404 A1 * | 9/2007 | Lan et al. | 180/339 |
| 2008/0023240 A1 | 1/2008 | Sunsdahl et al. | |
| 2008/0023249 A1 | 1/2008 | Sunsdahl et al. | |
| 2008/0308334 A1 | 12/2008 | Leonard et al. | |
| 2009/0000849 A1 | 1/2009 | Leonard et al. | |
| 2009/0071737 A1 | 3/2009 | Leonard et al. | |
| 2009/0071739 A1 | 3/2009 | Leonard et al. | |

(Continued)

FOREIGN PATENT DOCUMENTS
EP  1 553 331 A1  7/2005

OTHER PUBLICATIONS

International Search Report and Written Opinion, dated Mar. 4, 2010, issued by the European Patent Office, for International PCT Application No. PCT/US2009/067513; 13 pages.

(Continued)

*Primary Examiner* — J. Allen Shriver, II
*Assistant Examiner* — Bryan Evans
(74) *Attorney, Agent, or Firm* — Faegre Baker Daniels LLP

(57) ABSTRACT

A utility vehicle is disclosed having a flat or quasi-flat floor section in an operator area. The utility vehicle may also include an air inlet for an engine intake system being forward of the operator area. The utility vehicle may also include an air inlet for a CVT cooling system positioned to draw air from the operator area. The utility vehicle may also one or more cup holders positioned in the operator area below seat level.

20 Claims, 16 Drawing Sheets

U.S. PATENT DOCUMENTS

2009/0091101 A1  4/2009  Leonard et al.
2009/0121518 A1  5/2009  Leonard et al.
2009/0301830 A1  12/2009 Kinsman et al.
2009/0302590 A1  12/2009 Van Bronkhorst et al.

OTHER PUBLICATIONS

Applicant's Demand and Article 34 Amendment filed with the International Prelminary Examining Authority, Munich, Germany, on Oct. 22, 2010 for International PCT Application No. PCT/US2009/067513; 19 pages.

International Preliminary Report on Patentability, dated Apr. 28, 2011, issued by the European Patent Office, Munich, Germany for International PCT Application No. PCT/US2009/067513; 15 pages.

* cited by examiner

VEHICLE

FIELD OF THE INVENTION

The present invention relates generally to a vehicle and in particular to a utility vehicle having an operator area including side-by-side seating.

BACKGROUND AND SUMMARY OF THE INVENTION

Utility vehicles are known. The present disclosure relates to vehicles, including utility vehicles. The present disclosure relates to utility vehicles having foot controlled pedals. The present disclosure relates to a floorboard for use with utility vehicles, and particularly for those with foot controlled pedals.

The following nine applications: (1) U.S. patent application Ser. No. 12/134,909, filed Jun. 6, 2008, titled SUSPENSION SYSTEMS FOR A VEHICLE, (2) U.S. patent application Ser. No. 12/135,107, filed on Jun. 6, 2008, titled VEHICLE, (3) U.S. patent application Ser. No. 12/092,191, filed Apr. 30, 2008 titled VEHICLE, (4) U.S. patent application Ser. No. 12/092,153, filed Apr. 30, 2008, titled VEHICLE, (5) U.S. patent application Ser. No. 12/050,048, filed Mar. 17, 2008, titled VEHICLE WITH SPACE UTILIZATION, (6) U.S. patent application Ser. No. 12/050,064, filed Mar. 17, 2008, titled VEHICLE WITH SPACE UTILIZATION, (7) U.S. patent application Ser. No. 12/092,151, filed Apr. 30, 2008, titled UTILITY VEHICLE HAVING MODULAR COMPONENTS, (8) U.S. patent application Ser. No. 12/050,041, filed Mar. 17, 2008, titled METHOD AND APPARATUS RELATED TO TRANSPORTABILITY OF A VEHICLE, and (9) U.S. patent application Ser. No. 12/218,572, filed Jul. 16, 2008, titled FLOORBOARD FOR A VEHICLE, collectively referred to herein as the "Utility Vehicle Applications" are related to utility vehicles. The disclosures of the Utility Vehicle Applications are expressly incorporated by reference herein.

In an exemplary embodiment of the present disclosure, a vehicle is provided. The vehicle comprising a plurality of ground engagement members including at least two front ground engagement members and at least two rear ground engagement members; a frame supported by the plurality of ground engagement members; a CVT supported by the frame; a prime mover supported by the frame and operatively coupled to at least one of the plurality of ground engagement members through the CVT to power movement of the vehicle; and an operator area supported by the frame and positioned between the at least two front ground engagement members and the at least two rear ground engagement members. The operator area including seating for at least two occupants in a side-by-side arrangement. The operator area also including steering controls operatively coupled to at least a portion of the plurality of ground engagement members, prime mover controls operatively coupled to the prime mover, and at least one cup holder. The at least one cup holder being provided in the operator area forward of and spaced apart from the seating and lower than a seating surface of the seating. In one example, the at least one cup holder is positioned lower than a dashboard of the utility vehicle and forward of a rear plane of the dashboard. In another example, the at least one cup holder is coupled to a front wall of the operator area. In a variation thereof, a first cup holder includes a first locator and the front wall of the operator area includes a second locator. The first locator and the second locator cooperating to couple the first cup holder to the front wall. In a further variation thereof, the first locator is a tab having a locating slot and the second locator is a slot in the front wall. The tab being positioned in the slot in the front wall such that the locating slot of the tab is aligned with the slot in the front wall. In a further example, the at least one cup holder includes a driver cup holder and a passenger cup holder, the driver cup holder being offset to a first side of a central longitudinal plane of the vehicle by a first distance and the passenger cup holder being offset to a second side of the central longitudinal plane of the utility vehicle by a second distance. In a variation thereof, a width of the operator area of the vehicle 100 is a third distance and the first distance is up to about 80 percent of one-half of the third distance. In another variation, a width of the operator area of the vehicle 100 is a third distance and the first distance is at least about 80 percent of one-half of the third distance. In still another variation, the first distance is equal to the second distance. In yet a further example, the at least one cup holder includes a driver cup holder and a passenger cup holder and the at least two front ground engagement members of the plurality of ground engagement members include a left front wheel and a right front wheel. The driver cup holder being offset from a central longitudinal plane of the vehicle such that a plane passing through a center of the driver side cup holder intersects the left front wheel and the passenger cup holder being offset from the central longitudinal plane of the vehicle such that a plane passing through a center of the passenger side cup holder intersects the right front wheel. In still another example, the at least one cup holder includes a first cup holder, a top surface of the first cup holder being at a first height from a floor of the operator area. The first height being closer to the seating surface of the seating than to the floor. In yet still another example, the at least one cup holder includes a first cup holder, a top surface of the first cup holder being at a first height from a floor of the operator area. The first height being closer to the floor than to the seating surface of the seating. In yet another example, the at least one cup holder includes a driver cup holder and a passenger cup holder which are equidistant from a central longitudinal plane of the vehicle, both of which are positioned lower than a dashboard of the utility vehicle and forward of a rear plane of the dashboard, and both of which are about a same height above a floor of the utility vehicle. In still another example, the at least one cup holder is detachable from a front wall of the operator area. In yet still a further example, the plurality of ground engagement members are a plurality of wheels; the prime mover is an internal combustion engine which is operatively coupled to at least one of the at least two ground engagement members and to at least one of the at least two rear ground engagement members; and the operator area is bounded by a floor, a wall extending from a driver side opening of the operator area to a passenger side opening of the operator area, a rear wall positioned below the seating, and a roll cage extending over the seating. In a variation thereof, the wall is a single component.

In another exemplary embodiment of the present disclosure, a vehicle is provided. The vehicle comprising a plurality of ground engagement members including at least two front ground engagement members and at least two rear ground engagement members; a frame supported by the plurality of ground engagement members; a CVT supported by the frame and contained within a housing; a prime mover supported by the frame and operatively coupled to at least one of the plurality of ground engagement members through the CVT to power movement of the vehicle; an operator area supported by the frame and positioned between the at least two front ground engagement members and the at least two rear ground engagement members; and a CVT cooling system being in fluid communication with an interior of the housing. The CVT cooling system having an air inlet positioned to draw air from the operator area to the interior of the housing. The operator area including seating, steering controls operatively coupled to at least a portion of the plurality of ground engagement members, and prime mover controls operatively coupled to the prime mover. In one example, the air inlet of the CVT cooling system is located below the seating of the operator area. In a variation thereof, the air inlet is generally aligned with a front plane of the seating. In another example, the air inlet is provided in an inlet housing which is coupled to a wall of the operator area. The wall having at least one opening positioned proximate the inlet housing such that air from the operator area passing through the at least one opening and the air inlet into the inlet housing. In a further example, the CVT cooling system further includes an exhaust duct which is in fluid communication with the housing and includes an air outlet. The air outlet of the exhaust duct being positioned lower than the air inlet of the of the CVT cooling system. In still another example, a length of the CVT cooling system is about 3.25 feet from the air inlet to the interior of the housing. In yet a further example, a length of the CVT cooling system is up to about 3.25 feet from the air inlet to the interior of the housing.

In yet another exemplary embodiment of the present disclosure, a vehicle is provided. The vehicle comprising a plurality of ground engagement members including at least two front ground engagement members and at least two rear ground engagement members; a frame supported by the plurality of ground engagement members; a CVT supported by the frame and contained within a housing; a prime mover supported by the frame and operatively coupled to at least one of the plurality of ground engagement members through the CVT to power movement of the vehicle; seating supported by the frame and providing a seating surface for at least two occupants in a side-by-side arrangement, steering controls operatively coupled to at least a portion of the plurality of ground engagement members; prime mover controls operatively coupled to the prime mover; and a CVT cooling system being in fluid communication with an interior of the housing and having an air inlet positioned lower than the seating and generally aligned with a front plane of the seating. In one example, the air inlet is provided in an inlet housing which is coupled to a wall positioned beneath the seating, the wall having at least one opening positioned proximate the inlet housing such that air passes through the at least one opening and the air inlet into the inlet housing. In another example, air traveling from the air inlet of the cooling system to the interior of the housing travels up to about 3.25 feet.

In still another exemplary embodiment of the present disclosure, a vehicle is provided. The vehicle comprising a plurality of ground engagement members including at least two front ground engagement members and at least two rear ground engagement members; a frame supported by the plurality of ground engagement members; a CVT supported by the frame; a prime mover supported by the frame and operatively coupled to at least one of the plurality of ground engagement members through the CVT to power movement of the vehicle; and an operator area supported by the frame and positioned between the at least two front ground engagement members and the at least two rear ground engagement members. The operator area including seating for at least two occupants in a side-by-side arrangement, steering controls operatively coupled to at least a portion of the plurality of ground engagement members, prime mover controls operatively coupled to the prime mover, and a floor having a quasi-flat floor portion extending from a central longitudinal plane of the vehicle towards a left side of the vehicle and a right side of the vehicle. The prime mover and the CVT being positioned to a first side of the quasi-flat floor portion of the floor and are operatively coupled to at least one of the ground engagement members positioned on a second side of the quasi-flat floor portion. In one example, the quasi-flat floor section is a floor section which functions as a flat floor section to an object supported thereon and includes some height variations. In another example, the height variations are up to about 1 inch. In yet another example, the height variations include regions recessed from a flat surface to direct fluid out of the operator area. In still another variation, the quasi-flat floor section extends a width of the vehicle, in yet still another variation, the quasi-flat floor section includes a generally flat floor surface which extends up to about 83 percent of a width of the vehicle. In a variation thereof, the generally flat floor surface is centered on the central longitudinal plane. In still another example, a length of the quasi-flat floor section is longer than a length of at least one of a driver side opening of the operator area and a passenger side opening of the operator area. In yet still another example, the prime mover and the CVT are positioned rearward of the quasi-flat floor portion and are coupled to at least one of the at least two front ground engagement members through a drive shaft extending below the quasi-flat portion of the floor. In a variation thereof, the vehicle further comprises a shiftable transmission supported by the frame and operatively coupled to the CVT to receive power from the CVT and to the drive shaft to provide power to the drive shaft, the shiftable transmission having an output shaft which is operatively coupled to the drive shaft at a first location which is above a lowermost plane of the frame and below a plane of the generally flat floor portion; and a front differential supported by the frame and positioned forward of the generally flat floor portion, the front differential having an input shaft which is operatively coupled to the drive shaft at a second location, the second location being above the lowermost plane of the frame. In a further variation thereof, the second location is higher than the first location. In still a further variation thereof, the second location is above the plane of the quasi-flat floor portion. In yet still a further variation, the floor in an area outside of the quasi-flat portion includes a foot guard member positioned proximate a first foot pedal of the prime mover controls. In still a further variation, the foot guard member defines a recess in an underside of the floor, a portion of the drive shaft being received in the recess. In another example, the floor in an area outside of the quasi-flat portion includes a foot guard member positioned proximate a first foot pedal of the prime mover controls. In yet another example, the prime mover is an internal combustion engine and the vehicle further comprises a prime mover air intake system including an air duct in fluid communication with the prime mover and having an air inlet positioned forward of the quasi-flat floor portion of the floor. The air duct extends from the air inlet towards the prime mover below the quasi-flat portion of the floor. In a variation thereof, the air inlet faces rearward towards the operator area. In another variation, the output shaft of the shiftable transmission is up to about 13.7 degrees from horizontal. In still another variation, the drive shaft angles upward from the first location to the second location by up to about 4.3 degrees from horizontal.

In a further exemplary embodiment of the present disclosure, a method of cooling a CVT of a utility vehicle which includes an operator area is provided. The method comprising the steps of positioning the CVT within a housing; providing a cooling system having a fluid inlet and a fluid conduit, an interior of the housing being in fluid communication with the fluid conduit of the cooling system; and positioning the fluid inlet to draw air from the operator area into the fluid conduit of the cooling system, in one example, the air inlet is provided in an inlet housing, an interior of which is in fluid communication with the fluid conduit of the cooling system. In a variation thereof, the method further comprises the steps of positioning the inlet housing below seating provided in the operator area; coupling the inlet housing to a wall of the operator area; and providing at least one opening in the wall of the operator area, the air from the operator area passing through the at least one opening and into the interior of the inlet housing. In a variation thereof, the step of coupling the inlet housing to the wall includes the steps of positioning tabs of the inlet housing in corresponding openings of the wall; and securing the inlet housing to wall with fasteners. In a further example, the method further comprises the step of positioning the fluid inlet such that the fluid inlet intersects a centerline of the utility vehicle. In a variation thereof, the method further comprises the step of further comprising the step of positioning the fluid inlet such that the fluid inlet draws air from an area of the operator area positioned lower than a seat of the operator area. In a variation thereof, the air travels a distance of up to about 3.25 feet from the fluid inlet to a fluid inlet of the housing. In a further example, the method further comprises the step of positioning the fluid inlet such that the fluid inlet draws air from an area of the operator area positioned lower than a seat of the operator area. In a variation thereof, the air travels a distance of up to about 3.25 feet from the fluid inlet to a fluid inlet of the housing. In another example thereof, the air travels a distance of up to about 3.25 feet from the fluid inlet to a fluid inlet of the housing.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
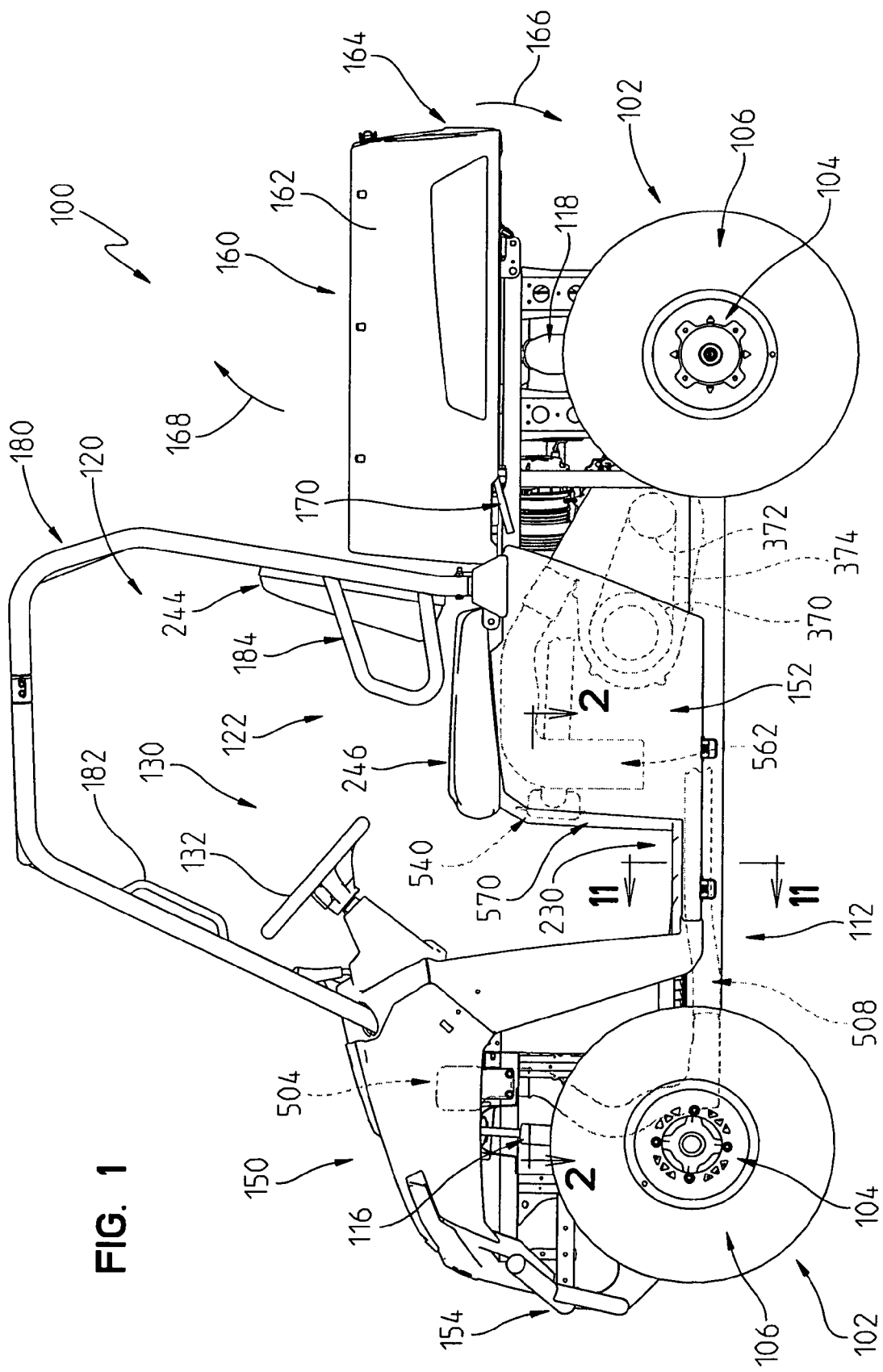
FIG. 1 illustrates a side view of an exemplary utility vehicle.
Figure 9:
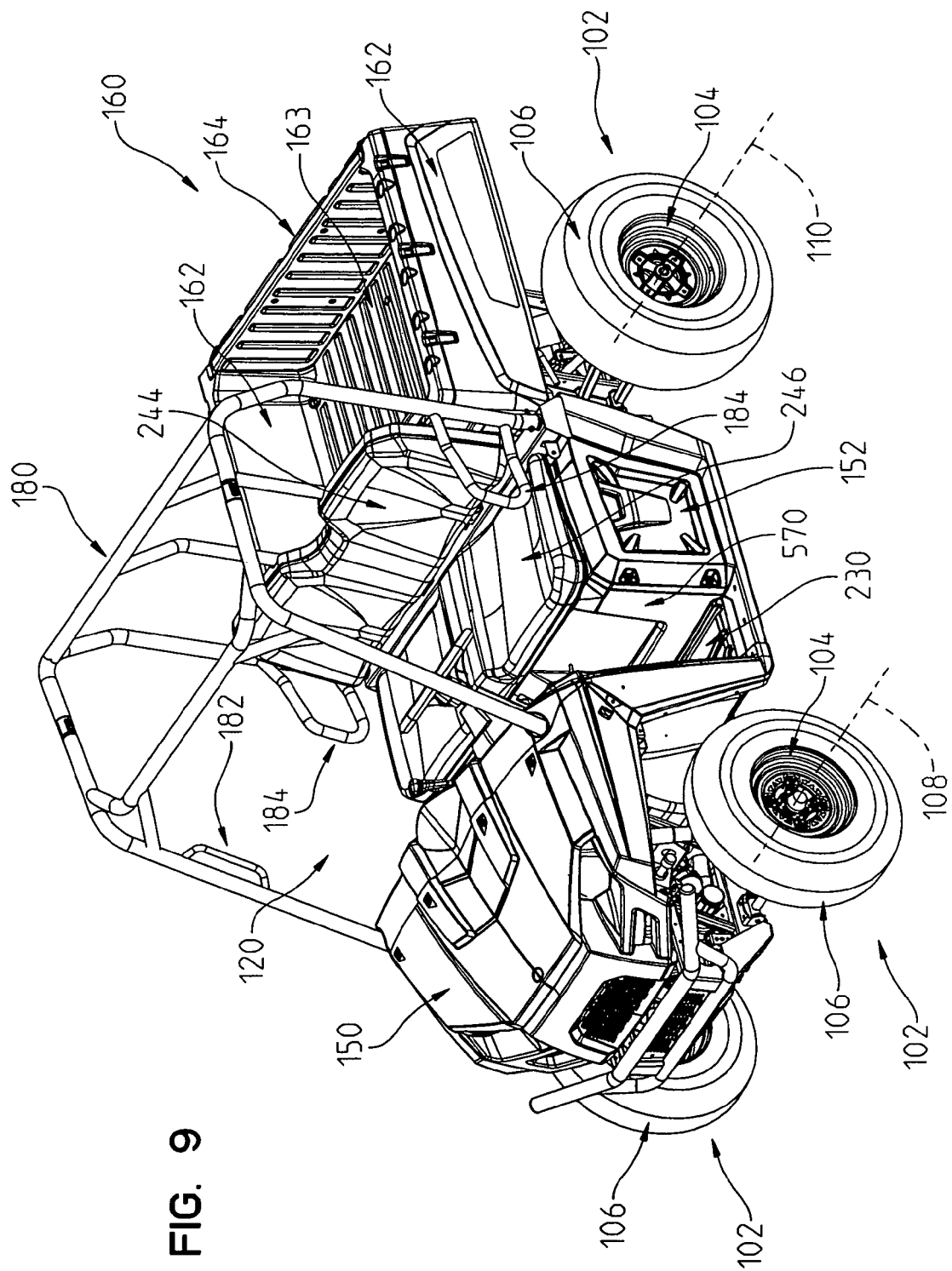
FIG. 9 illustrates a first, perspective view of the utility vehicle of FIG. 1.

Referring to FIG. 1, an illustrative embodiment of a vehicle 100 is shown. Vehicle 100, as illustrated, includes a plurality of ground engagement members 102. Illustratively, ground engagement members 102 are wheels 104 and associated tires 106. The illustrated vehicle 100 includes two front wheels defining a front axle 108 (see FIG. 9) and two rear wheels defining a rear axle 110 (see FIG. 9). Both of the two front wheels and both of the two rear wheels are coupled to a frame 112 through suspension systems 116 and 118. Exemplary suspension systems are disclosed in one or more of the Utility Vehicle Applications which are expressly incorporated by reference herein. Although four wheels are shown, other arrangement of wheels are contemplated, such as more than two wheels per axle or additional axles, such as disclosed in the Utility Vehicle Applications which are expressly incorporated by reference herein.

Other exemplary ground engagement members include skis and tracks. In one embodiment, one or more of the wheels may be replaced with tracks, such as the Prospector II Tracks available from Polaris Industries, Inc. located at 2100 Highway 55 in Medina, Minn. 55340.

Vehicle 100 includes an operator area 120 which includes seating 122 for one or more passengers. As shown the seating is for at least two passengers in a side-by-side arrangement. The operator area 120 corresponds to the portion of vehicle 110 wherein an operator is situated, along with one or more passengers, while operating vehicle 100. The operator area 120 is bounded by a floor assembly 230, a wall 222, a rear wall 570 positioned below the seating 122, and a roll cage 180 extending over the seating 122.

Operator area 120 further includes a plurality of operator controls 130 by which an operator may provide input to control vehicle 100. Controls 130 include a steering wheel 132 which is rotated by the operator to change the orientation of one or more of ground engagement members 102, such as the wheels associated with front axle 106, to steer vehicle 100. In one embodiment, steering wheel 132 changes the orientation of the wheels of axle 106 and axle 108 to provide four wheel steering.

Figure 2:
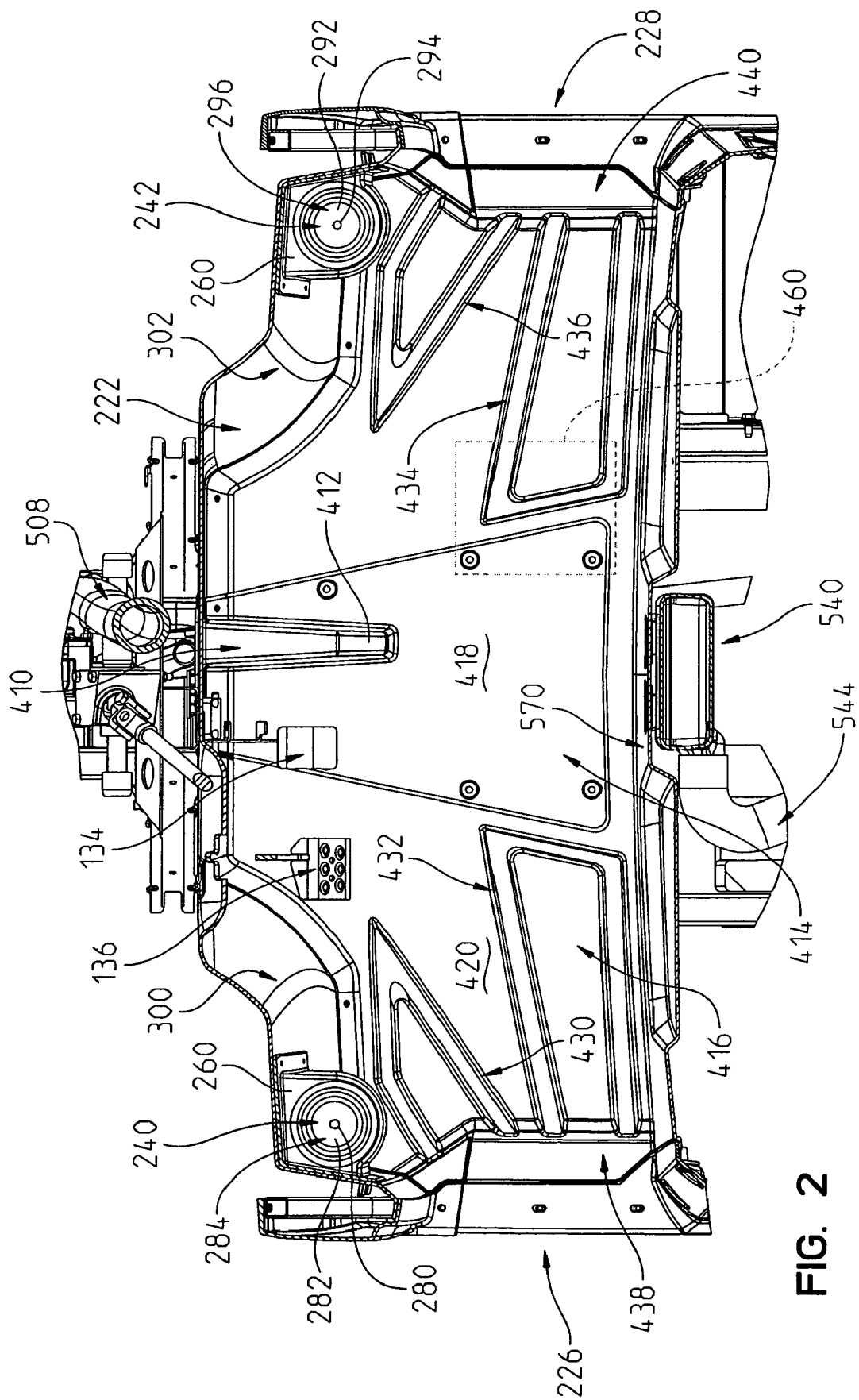
FIGS. 2 and 2A illustrate a top view a floor of an operator area of the utility vehicle of FIG. 1 along lines 2-2 in FIG. 1.
Figure 6:
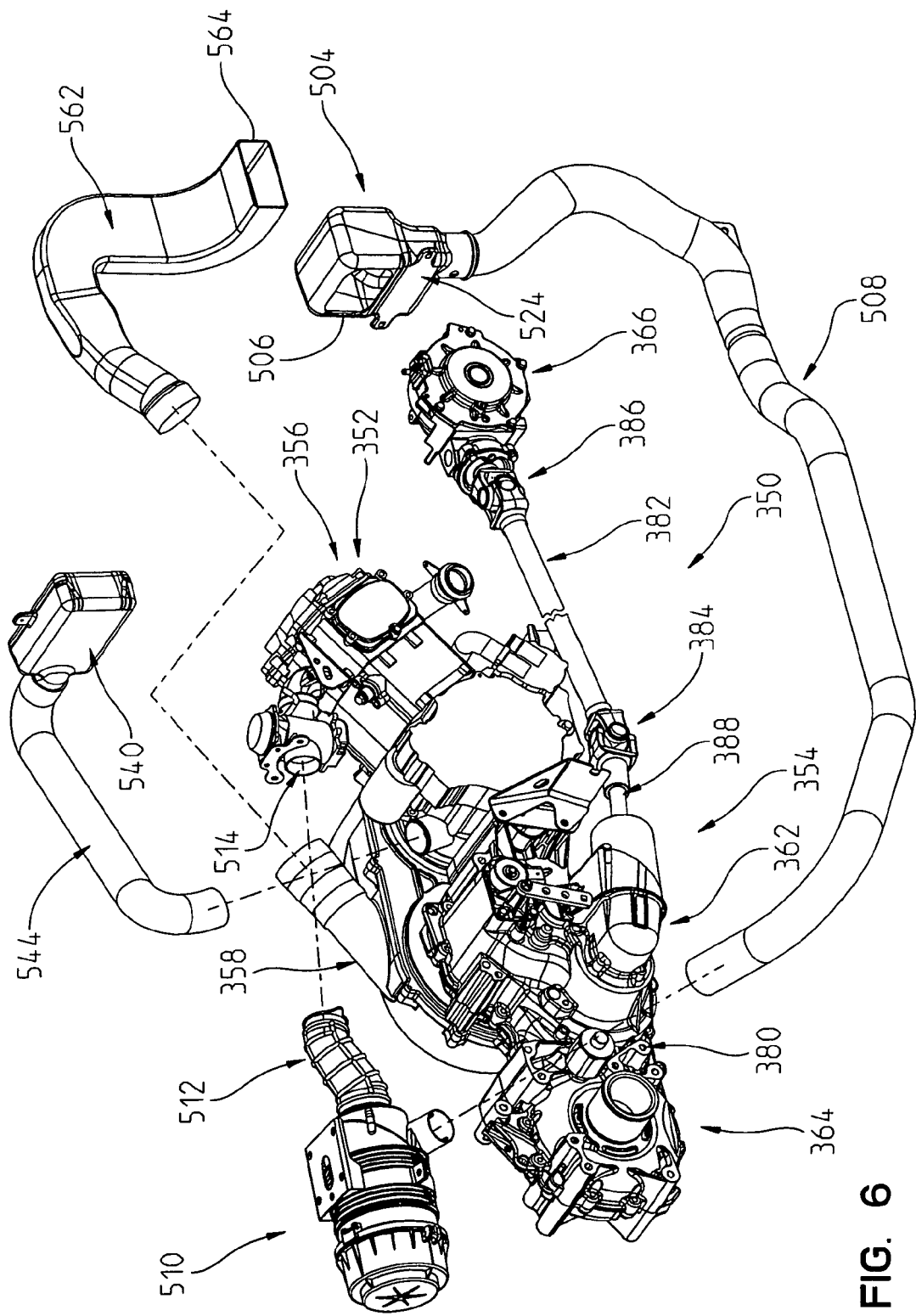
FIG. 6 illustrates a second perspective view of the components of FIG. 5 showing portions of the CVT cooling system and the prime mover cooling or air intake system exploded.

Referring to FIG. 2; controls 130 also include a first foot pedal 134 actuatable by the operator to control the operation of a prime mover 352 (see FIG. 6). In the illustrated embodiment, prime mover 352 is an internal combustion engine 356 and first foot pedal 134 is actuatable to control an acceleration and speed of vehicle 100 through the control of the internal combustion engine 356. Controls 130 further includes a second foot pedal 136 actuatable by the operator to decelerate vehicle 100 through a braking system (not shown). Additional details regarding exemplary braking systems are described in one or more of the Utility Vehicle Applications which are expressly incorporated by reference herein.

Returning to FIG. 1, vehicle 100 further includes a front body assembly 150 supported by the frame 112 and a side body assembly 152 supported by the frame 112. A front bumper 154 is also supported by the frame 112. In one embodiment, vehicle 100 includes a front platform as described in one or more of the Utility Vehicle Applications which are expressly incorporated by reference herein.

Vehicle 100 further includes a cargo bed 160 supported by the frame 112 behind the operator area 120. Cargo bed 160 includes a plurality of walls 162 and a floor 163 (see FIG. 10) which define a cargo carrying region of vehicle 100. Cargo bed 160, in the illustrated embodiment, includes a tailgate 164 which may be rotated in direction 166 to improve ingress to and egress from cargo bed 160. In the illustrated embodiment, cargo bed 160 is a dump bed wherein a front portion may be raised in direction 168. A latch member 170 is provided to release bed 160 so that it may be dumped. In one embodiment, a shock or other device is provided to assist in the rotational movement of bed 160 in direction 168. In one embodiment, bed 160 is rigidly coupled to frame 112. In one embodiment, vehicle 100 includes a rear platform as described in one or more of the Utility Vehicle Applications which are expressly incorporated by reference herein.

Cargo bed 160 further includes a plurality of mounts 161 (see FIG. 12) for receiving an expansion retainer (not shown) which may couple various accessories to bed 160. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein.

Vehicle 100 includes a roll cage 180 which protects passengers positioned in operator area 120. Roll cage 180 is supported by frame 112. Handles 182 and 184 are provided to assist a passenger, such as the operator, in entering and exiting operator area 120.

Figure 7:
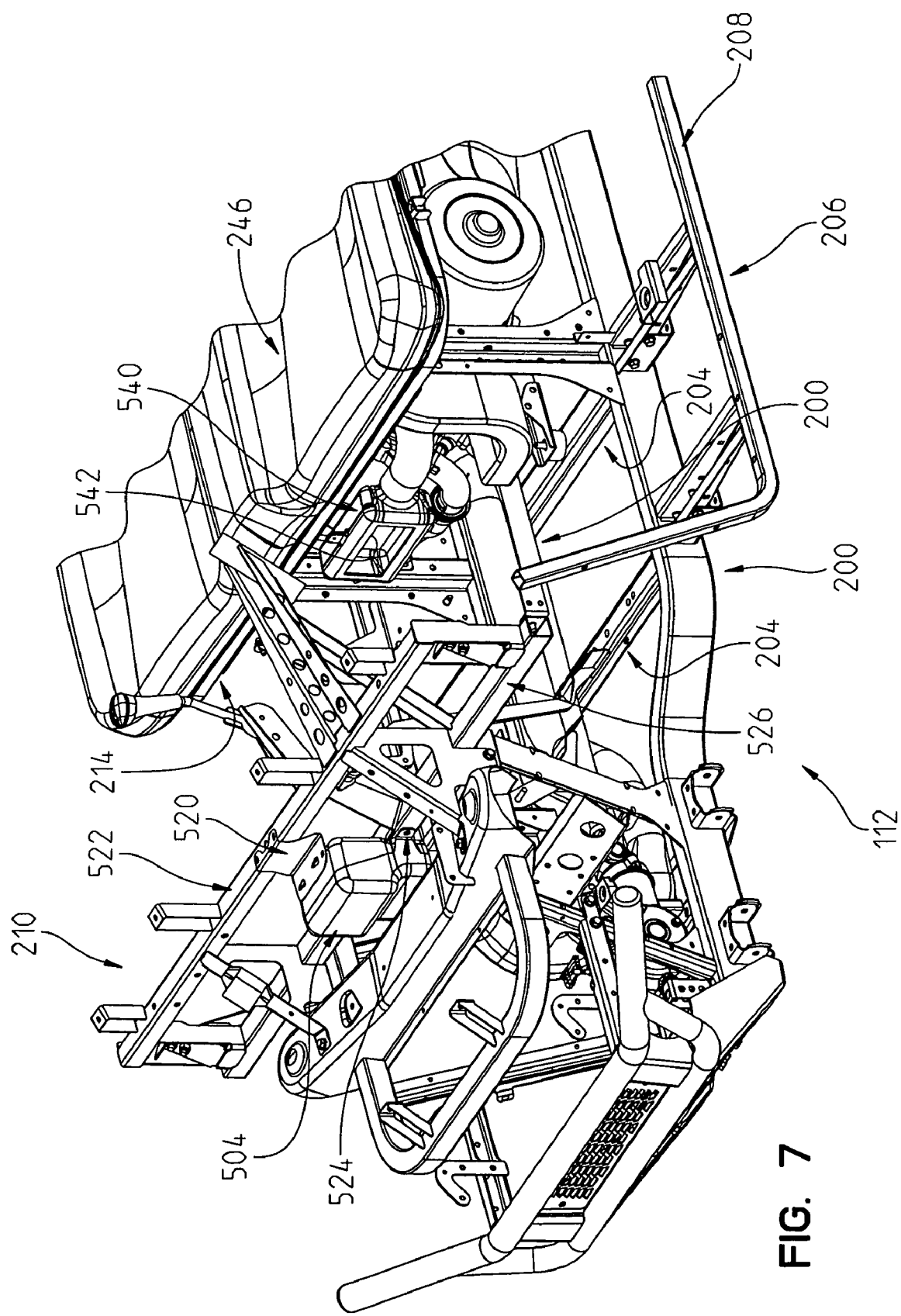
FIG. 7 illustrates the location of the CVT cooling system and the prime mover cooling or air intake system relative to a frame of the utility vehicle of FIG. 1.

Referring to FIG. 7, frame 112 includes a pair of frame rails 200 which generally extend along a longitudinal extent of vehicle 100. In one embodiment, frame rails 200 extend from the front of vehicle 100 to underneath cargo bed 160 forward of rear axle 110. Frame rails 200 includes attachment brackets 202 for the front suspension 116 of front axle 108. Extending between frame rails 200 are a plurality of cross frame members 204. Attached to an outside portion of frame rails 200 are operator area support structures 206 which includes rails 208. Frame 112 further includes a first upper portion 210 which supports a dashboard assembly 212 (see FIG. 10) and a second upper portion 214 which supports seating 122. In one embodiment, the construction of frame 112 may be the same as described in one or more of the Utility Vehicle Applications which are expressly incorporated by reference herein.

Figure 10:
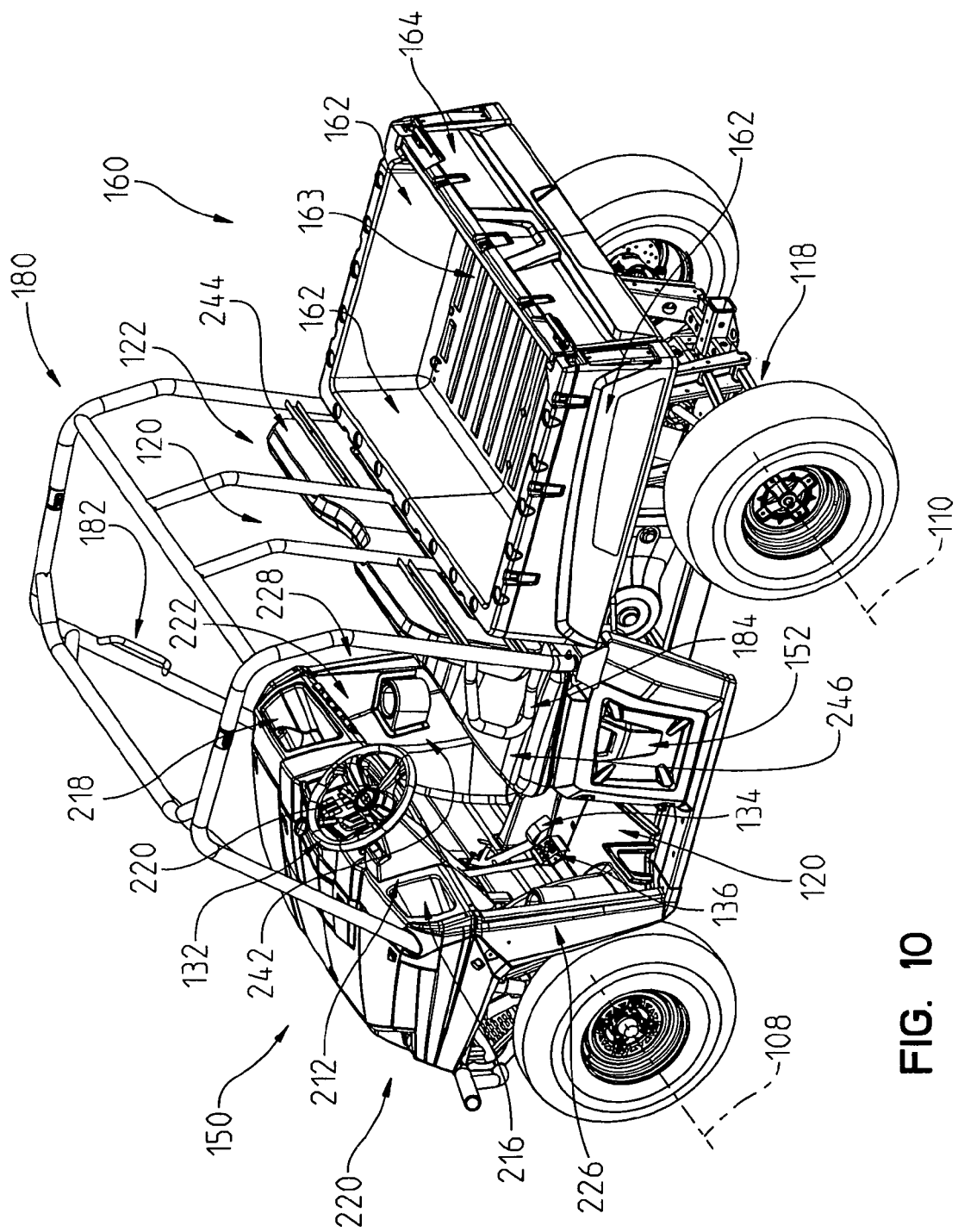
FIG. 10 illustrates a second, perspective view of the utility vehicle of FIG. 1.

Referring to FIG. 10, dashboard assembly 212 includes a driver side storage bin 216, a passenger storage bin 218, and an operator communication center 220. Operator communication center 220 may include output devices, such as a speedometer, other gauges, lights, and other suitable output devices, and input devices, such as switches and other suitable input devices. In one embodiment, vehicle 100 includes under dash storage as described in U.S. patent application Ser. No. 12/134,909, filed Jun. 6, 2008, titled SUSPENSION SYSTEMS FOR A VEHICLE, and U.S. patent application Ser. No. 12/135,107, filed on Jun. 6, 2008, titled VEHICLE, the disclosures of which are expressly incorporated by reference herein.

Figure 11:
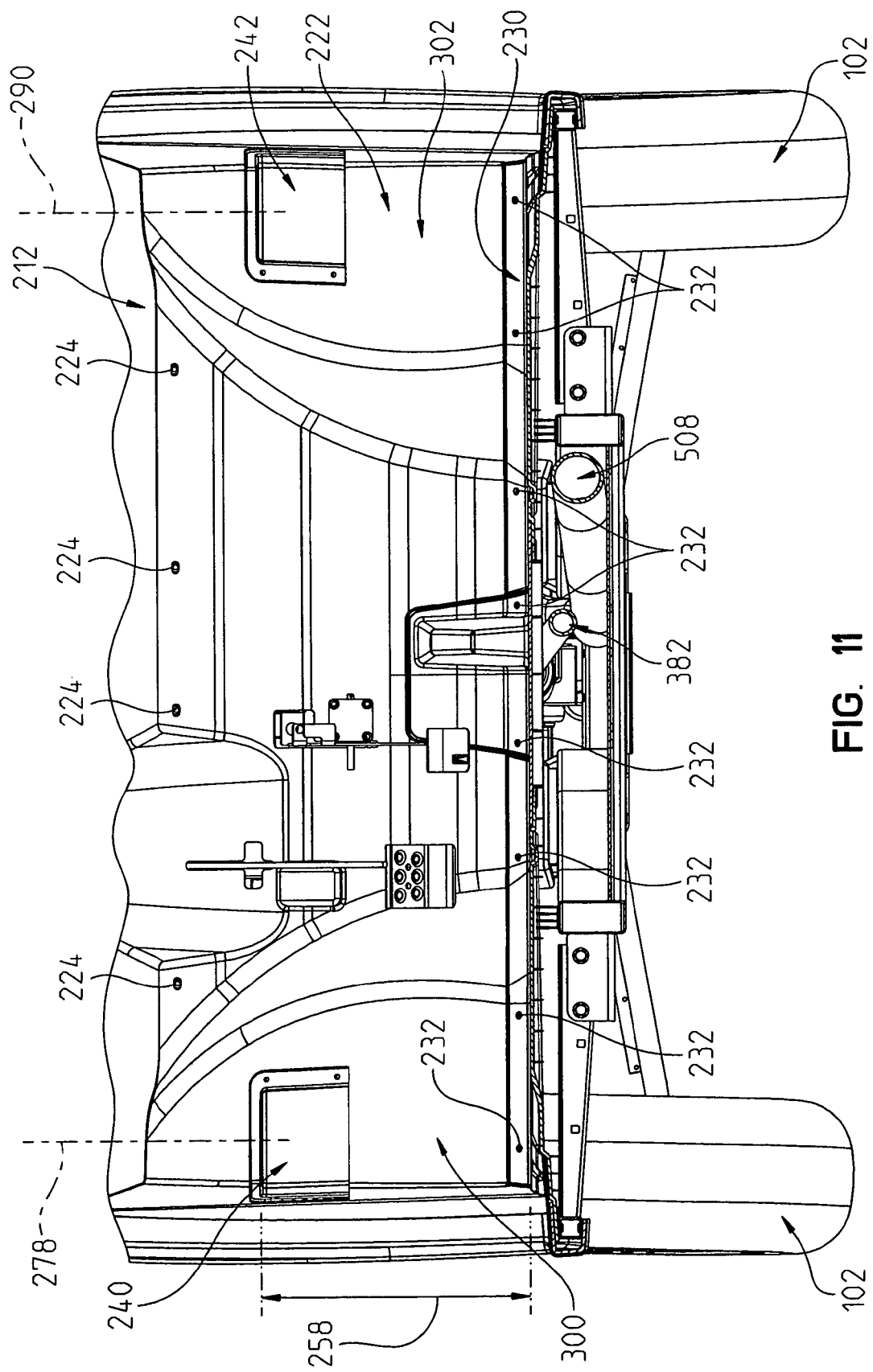
FIG. 11 illustrates a view of the utility vehicle along lines 11-11 in FIG. 1.

A lower portion of operator area 120 is separated from a front portion 220 of vehicle 100 by a wall 222. As shown in FIG. 2, wall 222 extends generally from a driver side opening 226 to a passenger side opening 228 and follows a generally u-shaped profile. Referring to FIG. 11, wall 222 is coupled to dashboard assembly 212 through a plurality of fasteners 224. Further, wall 222 is coupled to a floorboard assembly 230 through a plurality of fasteners 232.

Figure 12:
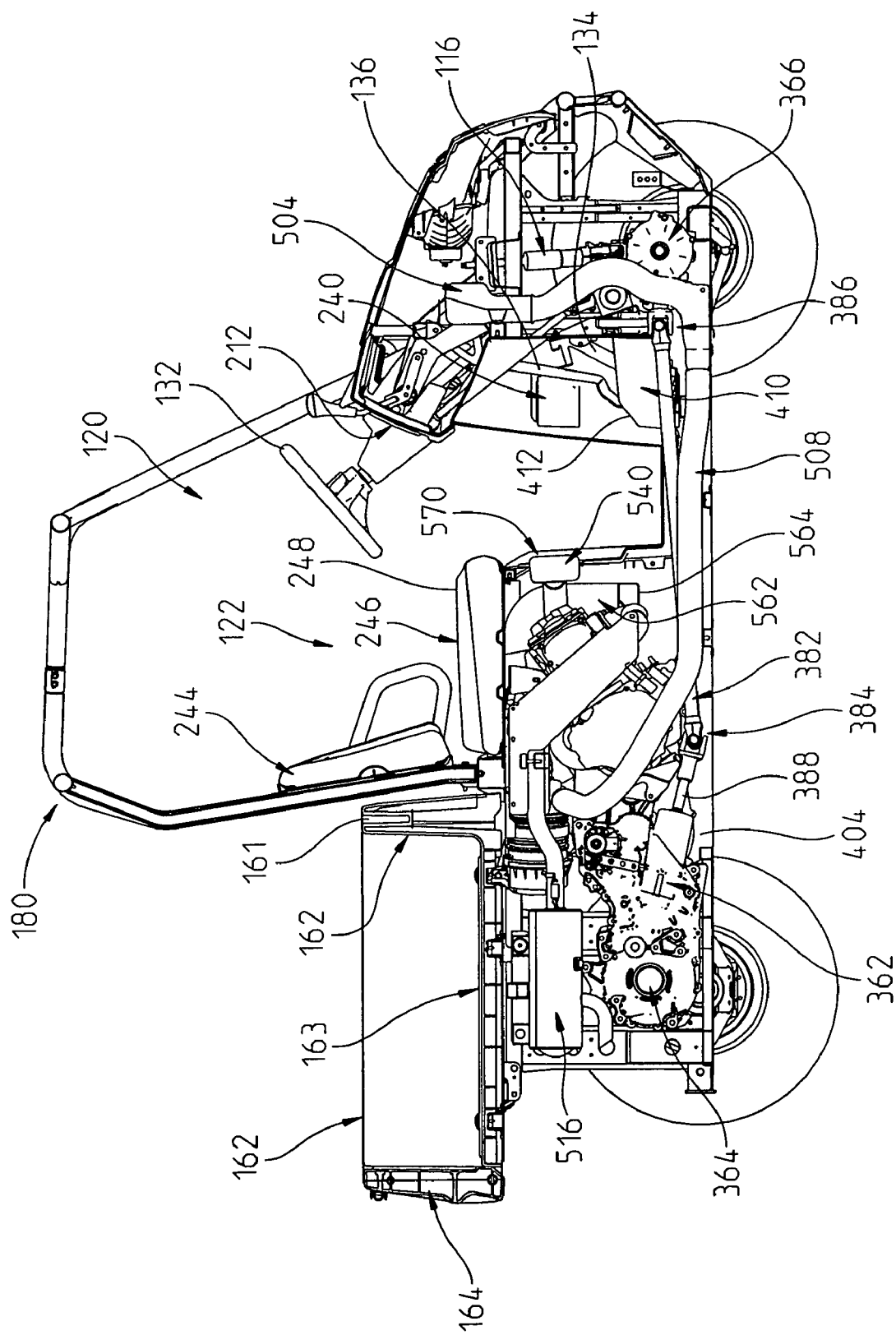
FIGS. 12 and 12A illustrate a view of the utility vehicle along lines 12-12 in FIG. 2A.
Figure 12A:
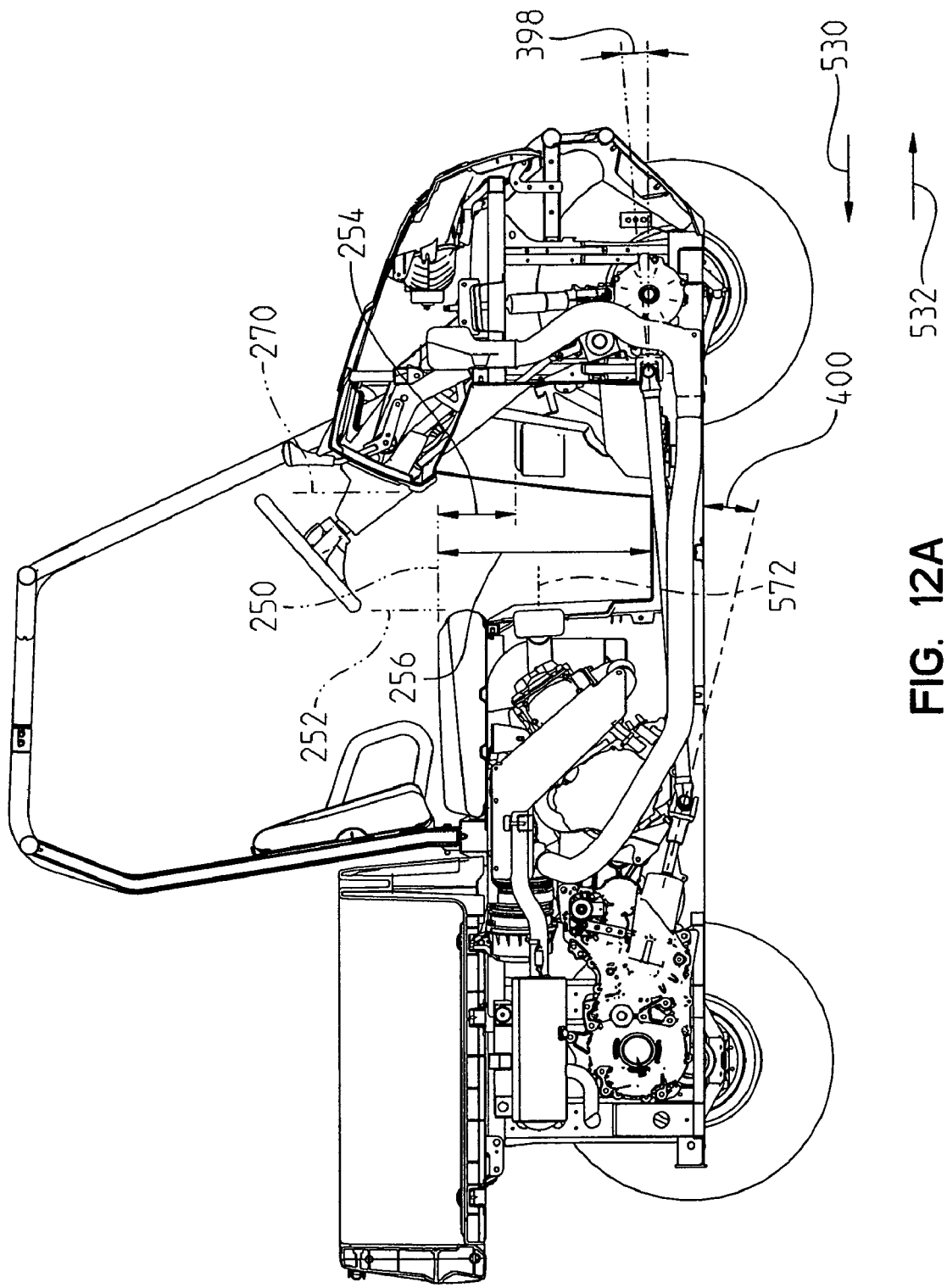

As shown in FIG. 11, a driver side cup holder 240 and a passenger side cup holder 242 are coupled to wall 222. As shown in FIG. 10, driver side cup holder 240 and passenger side cup holder 242 are provided in the operator area 120 forward of and spaced apart from the seating 122. Referring to FIG. 12, seating 122 includes a seat back portion 244 and a seat bottom portion 246. Seat bottom portion 246 includes a seating surface 248 whose height is generally indicated by plane 250 which passes through the highest portion of seat bottom portion 246. Referring to FIG. 12A, a forwardmost portion of seat bottom portion 246 is generally indicated by a plane 252. Seating surface 248 may be generally flat or contoured. In one embodiment, seat bottom portion 246 is tilted from horizontal by about 8.5 degrees such that the back edge of the seat bottom (proximate the bed 160) is lower than the front edge of the seat bottom. In one embodiment, seat back portion 244 is titled towards bed 150 from vertical about 17 degrees. In the illustrated embodiment, seating surface 248 is a bench seat. In one embodiment, seat bottom portion 246 includes separate sections which may be spaced apart or abutting. In the illustrated embodiment, seatback portion 244 is a continuous section. In one embodiment, seatback portion 244 includes separate sections which may be spaced apart or abutting, seating surface of the seating.

As also shown in FIG. 10, driver side cup holder 240 and passenger side cup holder 242 are provided in the operator area 120 lower than plane 250 of seating 122. In the illustrated embodiment, driver side cup holder 240 and passenger side cup holder 242 are mirror images of each other. Referring to FIG. 12A, driver side cup holder 240 is shown. A top surface 260 (see FIG. 4 which shows the corresponding top surface of passenger side cup holder 242) of driver side cup holder 240 is below plane 250. In one embodiment, top surface 260 is about 7.6 inches below plane 250 (corresponding to distance 254 in FIG. 12A) and plane 250 is about 19.7 inches above floorboard assembly 230 (corresponding to distance 256 in FIG. 12A) resulting in top surface 260 being about 12.1 inches above floorboard assembly 230 (corresponding to distance 258 in FIG. 11).

In one embodiment, at least one of driver side cup holder 240 and passenger side cup holder 242 are below plane 250 such that distance 254 from plane 250 to top surface 260 is up to about 39 percent of distance 256. In one example, driver side cup holder 240 and passenger side cup holder 242 are at the same height. In one embodiment, at least one of driver side cup holder 240 and passenger side cup holder 242 are below plane 250 such that distance 254 from plane 250 to top surface 260 is at least about 39 percent of distance 256. In one example, driver side cup holder 240 and passenger side cup holder 242 are at the same height. In one embodiment, at least one of driver side cup holder 240 and passenger side cup holder 242 are positioned such that distance 254 is less than one-half of distance 256. In one embodiment, at least one of driver side cup holder 240 and passenger side cup holder 242 are positioned such that distance 254 is greater than one-half of distance 256. In one embodiment, at least one of driver side cup holder 240 and passenger side cup holder 242 are positioned such that distance 254 is one-half of distance 256.

Referring to FIG. 12A, driver side cup holder 240 and passenger side cup holder 242 are both positioned lower than dashboard assembly 212. Further, driver side cup holder 240 and passenger side cup holder 242 are forward of a rear portion of dashboard assembly 212 which is indicated by plane 270.

Referring to FIG. 2, driver side cup holder 240 and passenger side cup holder 242 are offset from a central longitudinal plane 272 of vehicle 100. In the illustrated embodiment, driver side cup holder 240 and passenger side cup holder 242 are offset from central longitudinal plane 272 by generally the same distance. In one embodiment, driver side cup holder 240 and passenger side cup holder 242 are offset from central longitudinal plane 272 by different distances.

Figure 2A:
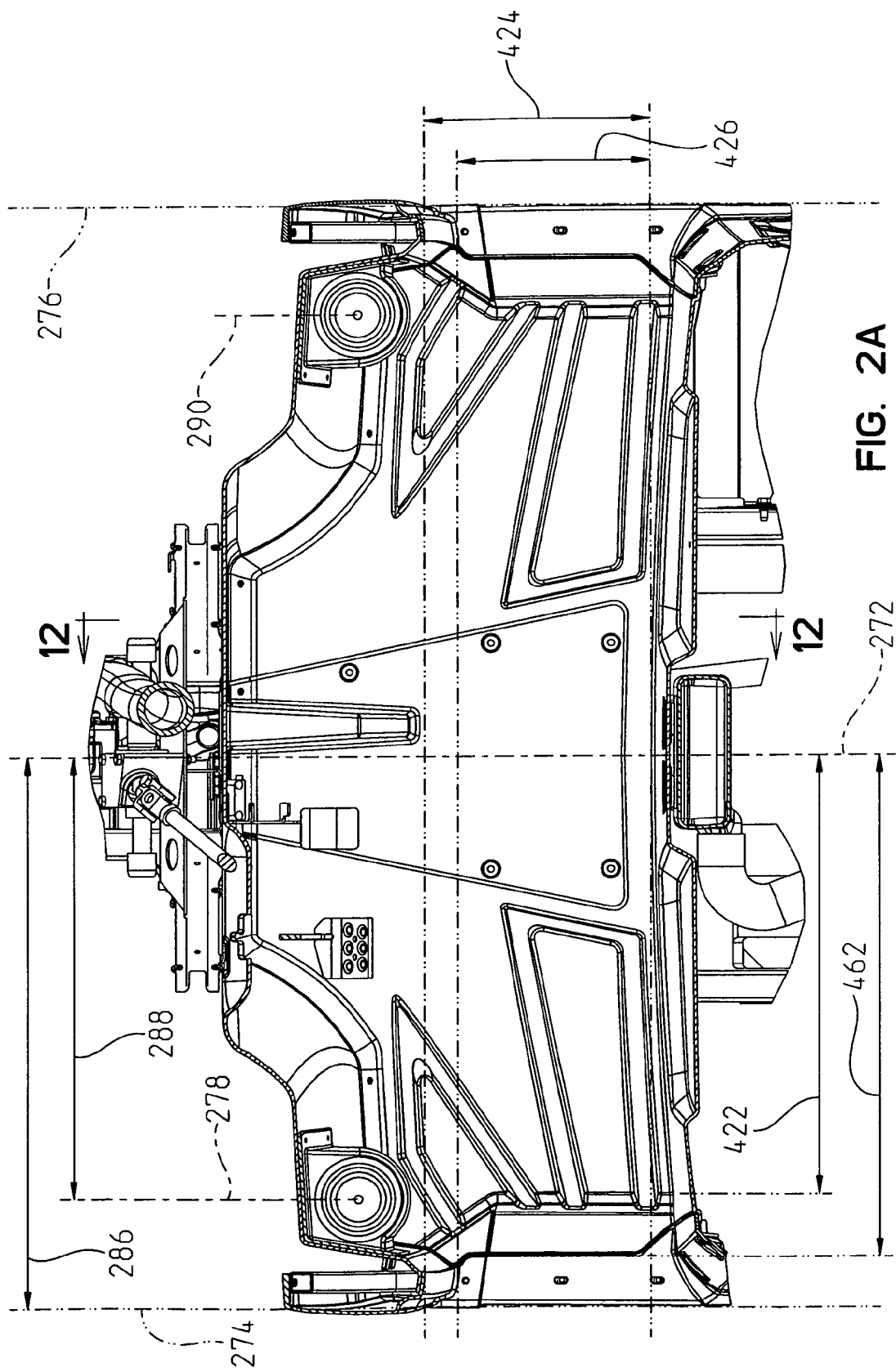
Figure 3:
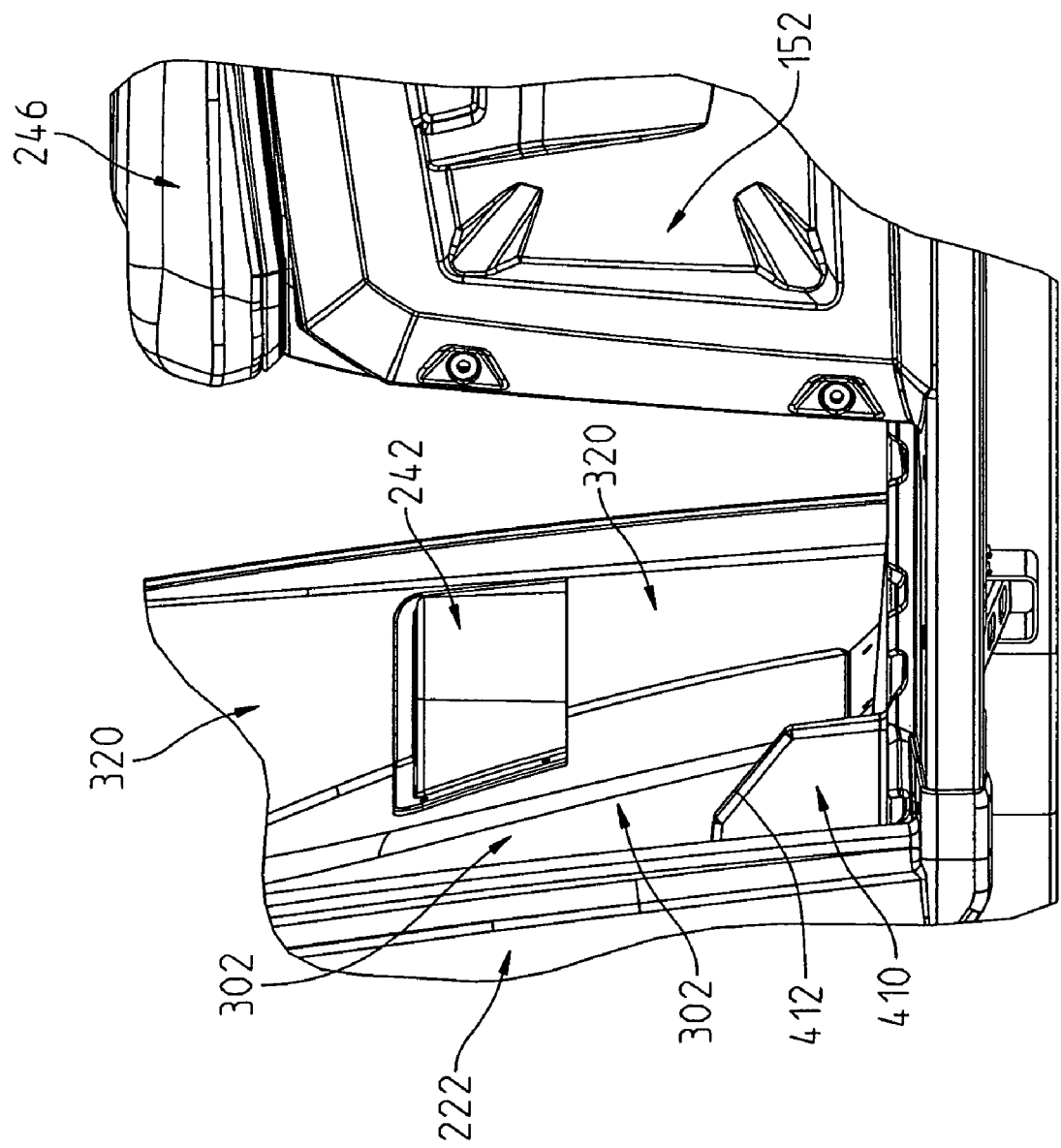
FIG. 3 illustrates a partial, perspective view looking into the operator area of the utility vehicle of FIG. 1 at generally floor level from a left side of the utility vehicle.

As shown in FIG. 2A, a left side plane 274 is parallel to central longitudinal plane 272 and generally corresponds to a left side of vehicle 100 and a right side plane 276 is parallel to central longitudinal plane 272 and generally corresponds to a right side of vehicle 100. A plane 278 is shown which is parallel to central longitudinal plane 272 and generally passes through a center of driver side cup holder 240. The center of driver side cup holder 240 includes a drain 280 provided in a bottom surface 282 of a container holding region 284 of driver side cup holder 240. A plane 290 is shown which is parallel to central longitudinal plane 272 and generally passes through a center of passenger side cup holder 242. The center of passenger side cup holder 242 includes a drain 292 provided in a bottom surface 294 of a container holding region 296 of passenger side cup holder 242. In one embodiment, a distance 288 between central longitudinal plane 272 and plane 278 is about 21.4 inches and a distance 286, which corresponds to a half width of vehicle 100, is about 26.7 inches. In one embodiment, distance 288 is up to about 80 percent of distance 286. In one embodiment, distance 288 is at least about 80 percent of distance 286.

Referring to FIG. 11, driver side cup holder 240 is positioned such that plane 278 overlaps at least a portion of a left, front ground engagement member 102 and passenger side cup holder 242 is positioned such that plane 290 overlaps at least a portion of a right, front ground engagement member 102. Driver side cup holder 240 is coupled to a left wheel well 300 of wall 222 and passenger side cup holder 242 is coupled to a right wheel well 302 of wall 222.

Figure 4:
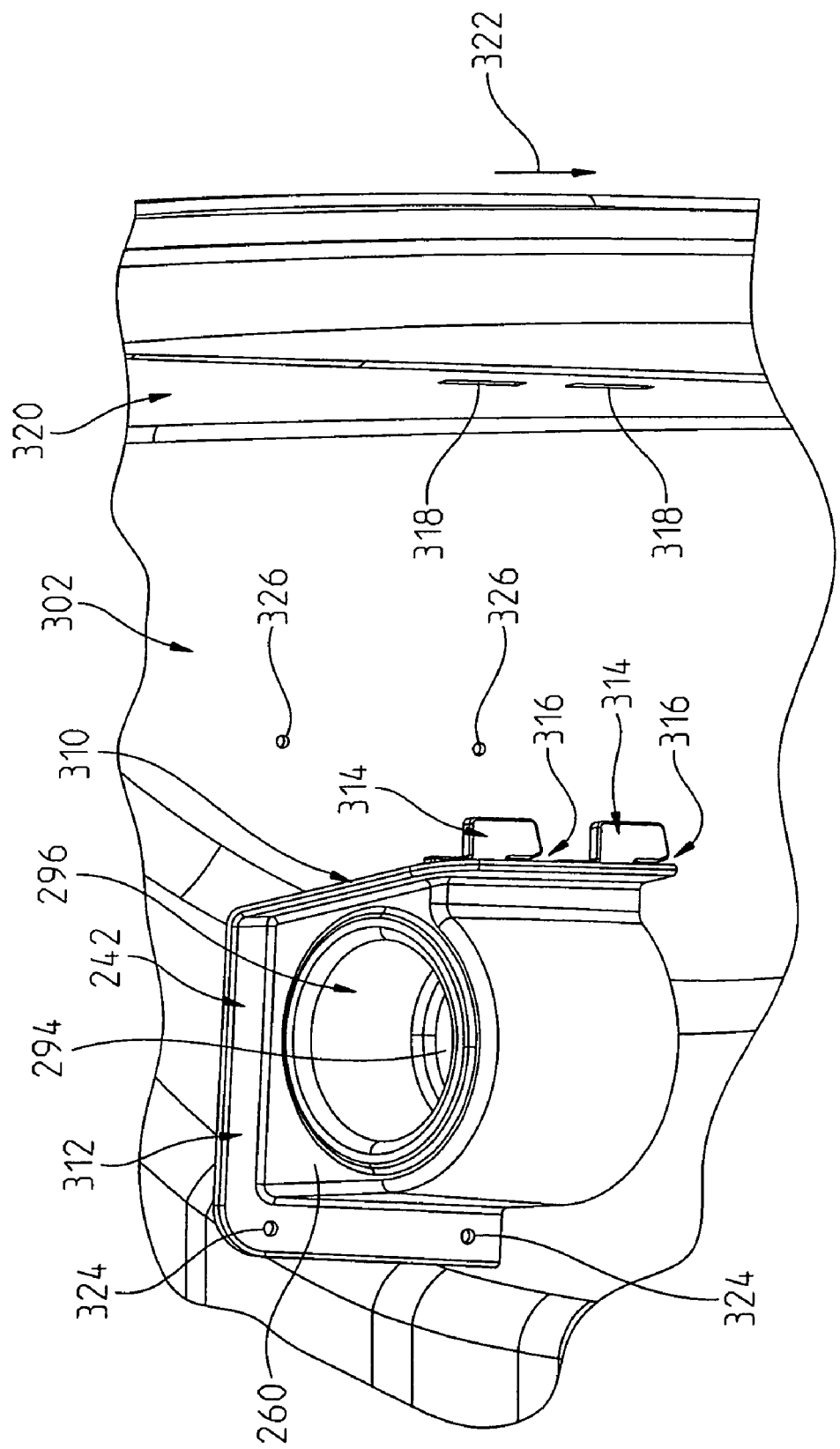
FIG. 4 illustrates a passenger side cup holder of the operator area detected from a front wall of the operator area.

Referring to FIG. 4, passenger side cup holder 242 is shown spaced apart from wall 222. Passenger side cup holder 242, like driver side cup holder 240, include a side flange 310 and a rear flange 312. Side flange 310 supports two tabs 314. Tabs 314 each define a slot 316 between a lower portion of tab 314 and side flange 310. To assemble passenger side cup holder 242 to wall 222, two tabs 314 are passed into slots 318 in a side portion 320 of wall 222. Slots 316 generally align with side portion 320 and receive a portion of side portion 320 when passenger side, cup holder 242 is moved down in direction 322. As such, tabs 314 and side portion 320 may be considered locators. Rear flange 312 also includes two openings 324 which receive fasteners (not shown) to secure rear flange 312 to right wheel well 302. Right wheel well 302 is also shown including openings 326 to receive the fasteners. In one embodiment, the fasteners are rivets. In one embodiment, the fasteners are screws or bolts. In one embodiment, both passenger side cup holder 242 and wall 222 are made from a polymeric material.

Figure 5:
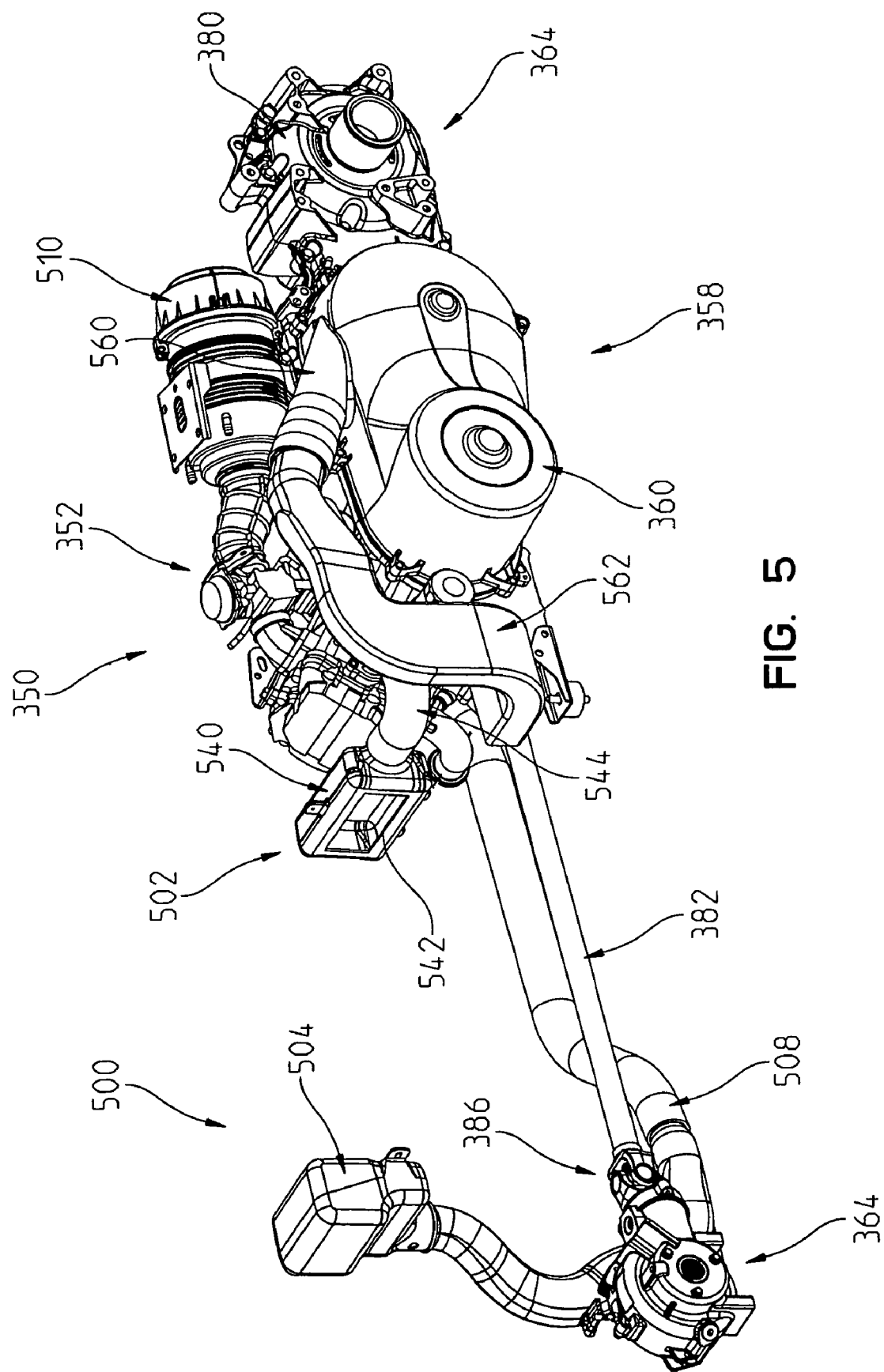
FIG. 5 illustrates a perspective view of a drive train, a CVT cooling system, and a prime mover cooling or air intake system of the utility vehicle of FIG. 1.

Referring to FIGS. 5 and 6, one or more of the ground engagement members 102 are operatively coupled to a drive train 350 to power the movement of vehicle 100. Drive train 350 is supported by frame 112. Exemplary drive trains 350 include prime movers 352 such as combustion engines and electric engines, or a combination thereof, together with a transmission 354. In one embodiment, drive train 350 may include a multi-fuel engine capable of utilizing various fuels. An exemplary multifuel engine capable of utilizing various fuels is disclosed in U.S. Pat. No. 7,431,024, the disclosure of which is expressly incorporated by reference herein. In one embodiment, drive train 350 includes a hybrid electric engine. In one embodiment, drive train 350 includes an electric engine.

In the illustrated embodiment, prime mover 352 is an internal combustion engine 356. Further, transmission 354 includes a continuously variable transmission ("CVT") 358 positioned within a housing 360 and a shiftable transmission 362. Shiftable transmission 362 is coupled to a rear differential 364 which provides power to rear axle 110 and a front differential 366 which provides power to front axle 108. In one embodiment, shiftable transmission 362 includes a forward high setting, a forward low setting, a neutral setting, a park setting, and a reverse setting.

In general, power from internal combustion engine 356 is provided to a drive member 370 (represented in FIG. 1) of CVT 358. Drive member 370 in turn provides power to a driven member 372 (represented in FIG. 1) through a belt 374 (represented in FIG. 1). Drive member 370, driven member 372, and belt 374 are contained within housing 360. Exemplary CVTs are disclosed in U.S. Pat. Nos. 3,861,229; 6,176, 796; 6,120,399; 6,860,826; and 6,938,508, the disclosures of which are expressly incorporated by reference herein.

Driven member 372 is coupled to and provides power to shiftable transmission 362. Shiftable transmission 362 is coupled to rear differential 364 within housing 380. An exemplary internal combustion engine 356 is the EH500PLE231 (1203585) available from Polaris Industries, Inc. located at 2100 Highway 55 in Medina, Minn. 55340. Further an exemplary shiftable transmission and rear differential combination is the 1322624 also available from Polaris Industries, Inc. located at 2100 Highway 55 in Medina, Minn. 55340.

Shiftable transmission 362 is coupled to front differential 366 through a drive shaft 382. Drive shaft 382 is coupled to an output shaft 388 of shiftable transmission 362 through a first universal joint 384 and to front differential 366 through a second universal joint 386. As shown generally in FIG. 1 and discussed in more detail herein floorboard assembly 230 includes a generally flat floorboard section. This is accomplished in part by having drive shaft 382 run between frame rails 200 as shown in FIG. 11. Floorboard assembly 230 includes members 231 molded as part of section 416 which provide strength for the recessed areas of section 416 and serve as spacers relative to frame rails 200.

Referring to FIG. 12A, drive shaft 382 angles upward from horizontal by an amount indicated as angle 398. In one embodiment, angle 398 is about 4.3 degrees. The angled arrangement of drive shaft 382 is due to the fact that universal joint 386 is positioned above pair of frame rails 200 and that a generally flat floorboard section is desired. As such, although drive shaft 382 is coupled to universal joint 386 above pair of frame rails 200, drive shaft 382 angles downward towards the rear of vehicle 100 between pair of frame rails 200 to permit the generally flat floor section of floorboard assembly 230. Downward angled drive shaft 382 meets a downwardly angled output shaft 388 of shiftable transmission 362 at universal joint 384. Output shaft 388 is angled downward from horizontal by an amount indicated as angle 400. In one embodiment, angle 400 is about 13.7 degrees.

Joint 384 is positioned so that it remains above a lower surface or plane 404 of pair of frame rails 200.

Floorboard assembly 230 does include a raised portion 410 to accommodate drive shaft 382 proximate to second universal joint 386. Raised portion 410 also serves as a foot guard to reduce the likelihood that a passenger's foot would actuate foot control 134. Raised portion 410 includes a foot rest surface 412 as well. Raised portion 410 is a part of a central floorboard member 414 which is coupled to a main floorboard member 416.

Figure 11A:
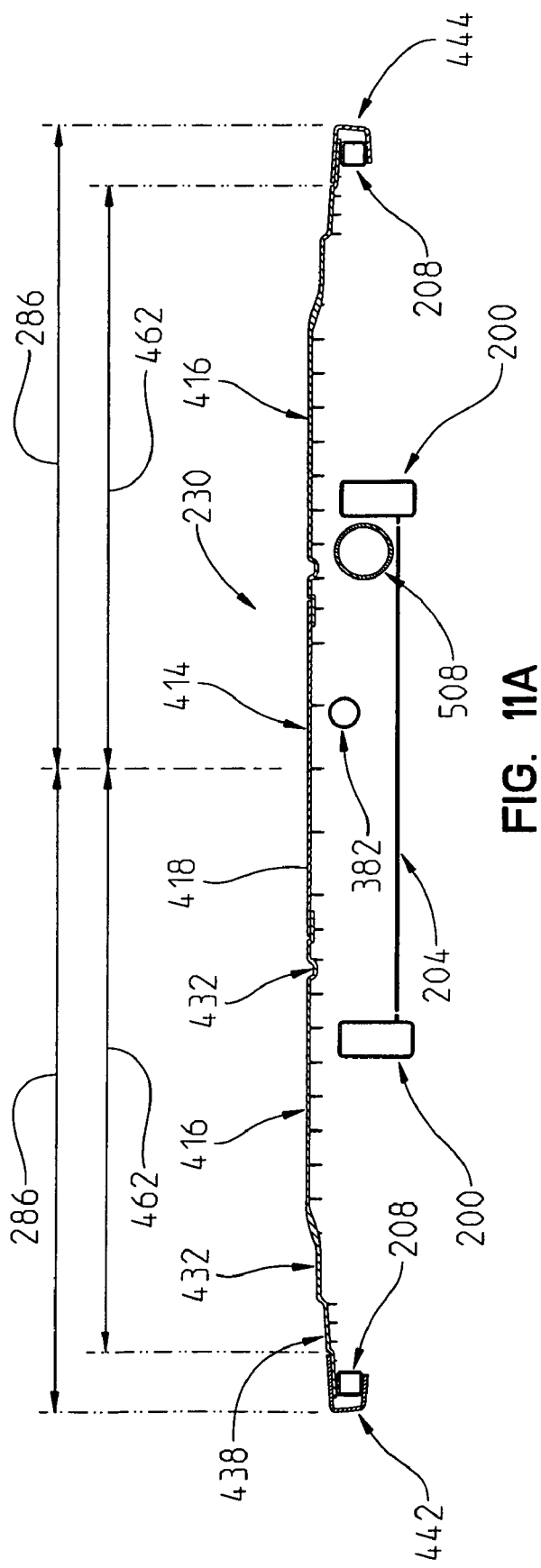
FIG. 11A illustrates the positions of the frame rails, fluid conduit of the prime mover cooling system, drive shaft, and the floor assembly of FIG. 11.
Figure 11B:
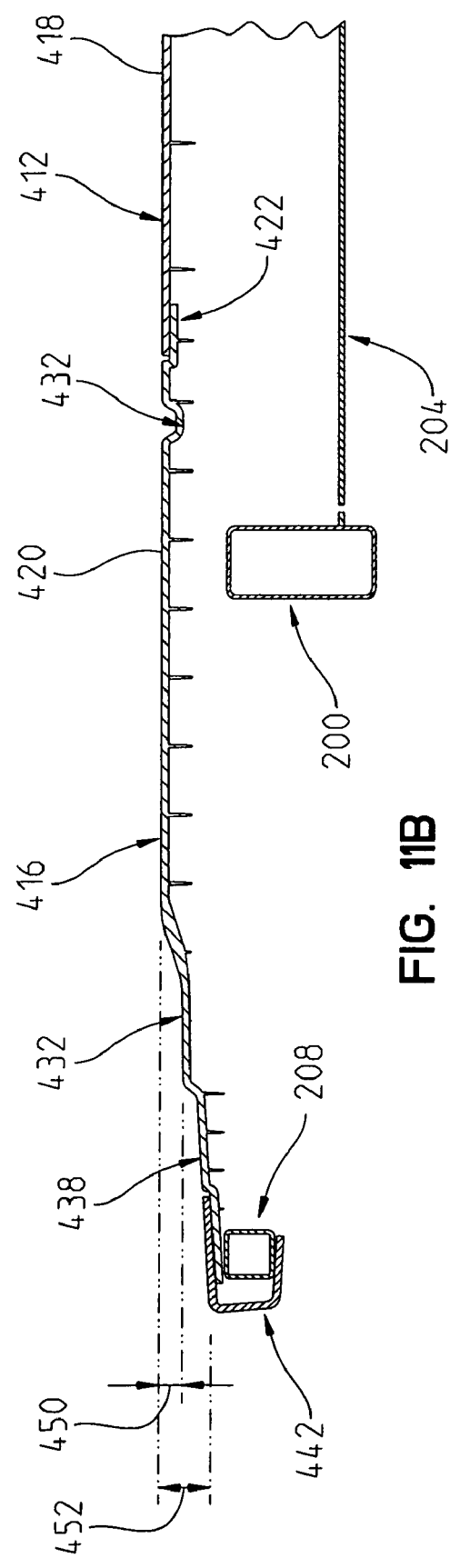
FIG. 11B illustrates a detail view of FIG. 11A.

Referring to FIGS. 11A and 11B, a top surface 418 of central floorboard member 414 is at the same height as a top surface 420 of main floorboard member 416. As such, top surface 418 and top surface 420 provide a flat surface which extends in a transverse direction a distance of about 22.1 inches from central longitudinal plane 272 as represented by distance 422 in FIG. 2A. As such, in one embodiment floorboard assembly 230 has a flat surface in a transverse direction for up to about 83 percent of a width of vehicle 100 as represented by twice distance 286. In one embodiment floorboard assembly 230 has a flat surface in a transverse direction for at least about 83 percent of a width of vehicle 100 as represented by twice distance 286.

Referring to FIG. 2, the flat surface of floorboard assembly 230 has a length of about 11.3 inches and extends from a rear edge of floorboard assembly 230 forward towards pedal 134. As shown in FIG. 2A, top surface 418 and top surface 420 extend for a distance 424 (about 11.3 inches) until raised portion 410 is encountered. Distance 424 is longer than an effective opening size of driver side opening 226 and passenger side opening 228 which is about 9.4 inches, as represented by distance 426. In one embodiment, distance 424, which is a length of the flat portion of top surface 418 and top surface 420 before an elevated object is encountered is at least about 120 percent longer than an effective opening size of driver side opening 226 and passenger side opening 228, as represented by distance 426. In this manner, a person entering operator area 120 through either of driver side opening 226 or passenger side opening 228 may walk all the way across operator area 120 to the other of driver side opening 226 and passenger side opening 228 on a flat surface.

The region bound by distance 424 and twice distance 422 in FIG. 2A is not completely flat, but includes some recessed regions 430, 432, 434, 436, 438, and 440. Recessed regions 430, 432, 434, and 436 provide channels for liquid to gather and be carried out of operator area 120. These channels are sloped away from central longitudinal plane 272 towards driver side opening 226 (recessed region 430 and recessed region 432) and passenger side opening 228 (recessed region 434 and recessed region 436) to carry the liquid in those directions. Each of regions 430, 432, 434, and 436 proximate to driver side opening 226 or passenger side opening 228 intersect with recessed regions 438 and 440. The liquid from regions 430, 432, 434, and 436 empties into regions 438 or 440, respectively. As shown in FIG. 11A, regions 438 and 440 are at the same height as covers 442 and 444 which are fastened to rails 208 of frame 112.

The recessed regions 430, 432, 434, and 436 generally drop about 0.5 inches from top surface 420 as represented by distance 450. The recessed regions 438 and 440 generally drop about 1 inch from top surface 420 as represented by distance 452. The combination of the flat surface 420 and 418 and the recessed regions 430, 432, 434, 436, 438, and 440 provide a quasi-flat floor section. As used herein the term "quasi-flat floor section" is defined as a floor section which functions as a flat floor section to an object supported thereon, but which has some height variations. For example, a passenger's foot positioned in area 460 (see FIG. 2) of floorboard assembly 230 would provide the impression that floorboard assembly 230 is a flat floor (such as minimal rocking) even though portions of the shoe worn by the operator is placed over recessed regions 434. Exemplary height variations may be recessed regions for directing liquid, such as recessed regions 430, 432, 434, 436, 438, and 440 in the illustrated embodiment, foot gripping components, such as treads, height variations due to overlapping floor sections, stylized reliefs, textured surfaces, a crown in the overall surface from side-to-side, and other features which cause a height variation. In one embodiment, acceptable height variations are up 1 inch. In one embodiment, an acceptable pitch for a crowned surface is 0.04 which generally corresponds to a drop of 1 inch (distance 452) over a run of 24.2 inches (distance 462).

Returning to FIGS. 5 and 6, drive train 350 includes an engine air intake system 500 and a CVT air intake system 502. Referring to FIG. 6, engine air intake system 500 includes an inlet housing 504 having an air inlet 506. Air enters inlet housing 504 through air inlet 506 and is communicated to an air conduit 508 coupled to inlet housing 504. Air conduit 508 is coupled on the other end to an air filter housing 510 which houses an air filter to filter dust and other particulates out of the air. Air filter housing 510 includes an air conduit 512 which is coupled to engine 356 and communicates air to air inlet 514 of engine 356 for use in combustion. Alternatively, in the case of an air-cooled engine a portion of the air may be communicated to a cooling system in the engine to cool engine. Exhaust gases from engine 356 are expelled through an exhaust system 516.

Referring to FIG. 7, inlet housing 504 is positioned forward of operator area 120 and is coupled to first upper portion 210 of frame 112. A first bracket 520 is coupled to a top portion of inlet housing 504 and is coupled to a first transverse member 522 of first upper portion 210. A second bracket 524 is coupled to a lower portion of inlet housing 504 and is coupled to a second transverse member 526 of first upper portion 210.

Referring to FIG. 12, air inlet 506 faces generally in direction 530. An air filter may be positioned in or coupled to inlet housing 504 to filter the air before it enters air conduit 508. Air conduit 508 extends down from inlet housing 504, under operator area 120 between frame rails 200 and below floorboard assembly 230 (see FIG. 11), and then up to air filter housing 510. In the illustrated embodiment, inlet housing 504 is positioned at a height generally in line with plane 250 (see FIG. 12A).

Figure 13:
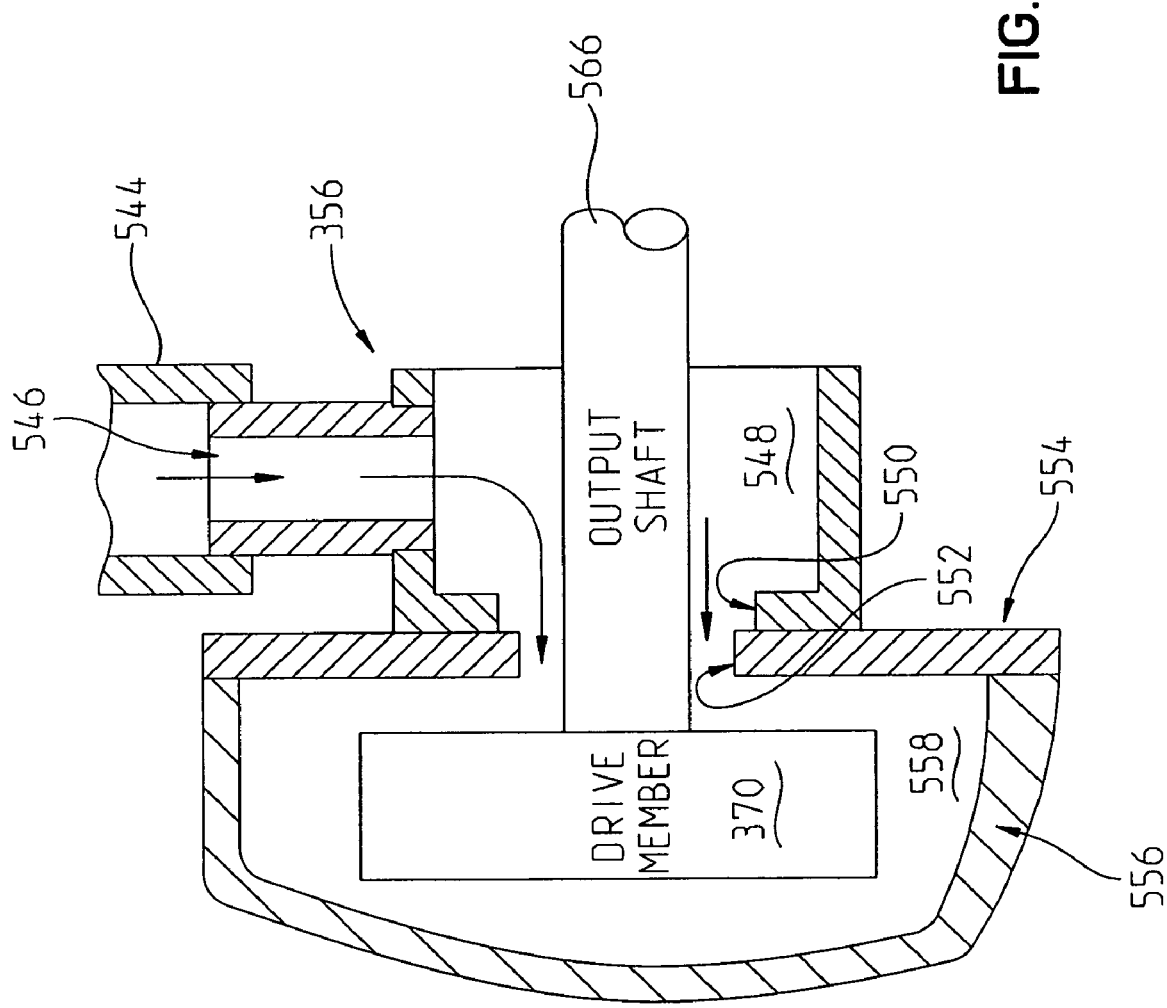
FIG. 13 illustrates a representative view of the air flow from a fluid conduit of the CVT cooling system, through a portion of the engine, and into a housing of the CVT.

Returning to FIG. 5, CVT air intake system 502 includes an air inlet housing 540 having an air inlet 542. Air inlet 542 faces generally in direction 532. An air filter may be positioned in or coupled to air inlet housing 540. Air inlet housing 540 is coupled to an air conduit 544 which is coupled to engine 356 at air inlet 546. As represented in FIG. 13, the air enters an interior 548 of internal combustion engine 356 and exits through an air outlet 550 of engine 356. An output shaft 566 of engine 356 also passes through air outlet and is coupled to drive member 370. The air then enters an interior 558 of housing 360 through an air inlet 552 in a base portion 554 of housing 360. The interior 558 of housing 360 is bounded by base portion 554 and a removable cover 556 of housing 360. The air in interior 558 cools drive member 370, driven member 372, and belt 374 and then exits housing 360 through a fluid conduit 560 in removable cover 556. An exhaust conduit 562 is coupled to fluid conduit 560. Exhaust conduit 562 has an exhaust outlet 564 (see FIG. 12) through which exhaust air from interior 558 is communicated to the atmosphere.

Referring to FIGS. 12 and 12A, air inlet housing 540 is coupled to a rear wall 570 of operator area 120. Rear wall 570 extends from seating 122 to floorboard assembly 230. A top portion of air inlet housing 540 is generally at the height of top surface 260 of driver side cup holder 240. A center of air inlet 542, as indicated by plane 572, is below plane 250 and above floorboard assembly 230. In one embodiment, plane 572 is about 9.2 inches below plane 250.

Figure 8:
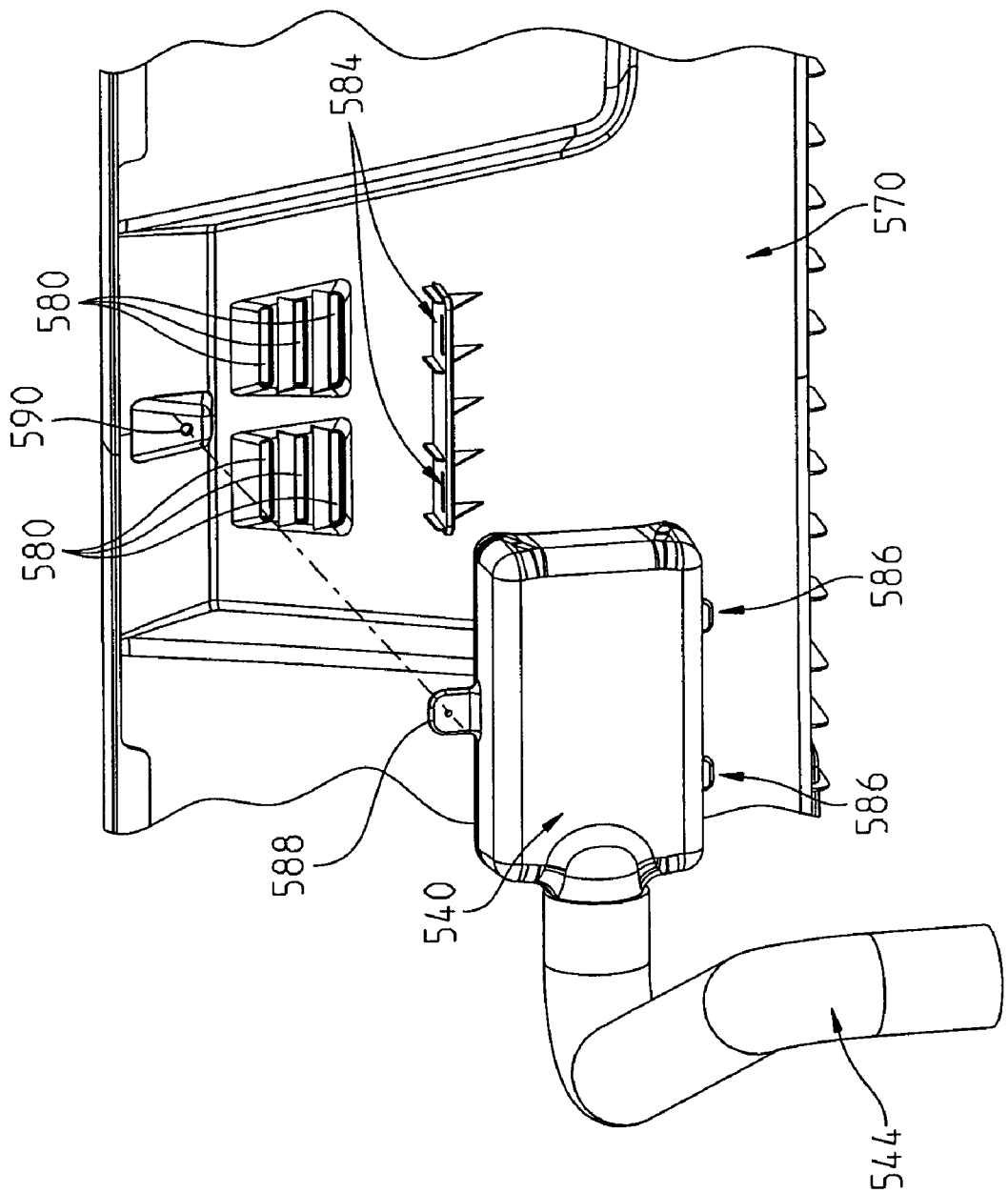
FIG. 8 illustrates the coupling of a inlet housing of the CVT cooling system to a wall of the operator area of the utility vehicle of FIG. 1.

Referring to FIG. 8, a back side of rear wall 570 is shown. Rear wall 570 includes a plurality of openings 580 through which air from operator area 120 is able to pass through rear wall 570 and into air inlet housing 540 through air inlet 542. Rear wall 570 also includes a support 582 including two openings 584 which receive tabs 586. A top tab 588 on air inlet housing 540 includes an opening which aligns with an opening 590 in rear wall 570. A fastener couples top tab 588 to rear wall 570. To assemble air inlet housing 540 to rear wall 570, tabs 586 are placed in openings 584 and then a fastener secures top tab 588 to rear wall 570.

Air inlet 542 of air inlet housing 540 is positioned lower than the seating 122 and generally aligned with a front plane 242 of the seating 122. In one embodiment, air travels about 3.25 feet from air inlet 542 to air inlet 552. In one embodiment, air travels up to about 3.25 feet from air inlet 542 to air inlet 552, having the distance from air inlet 542 to air inlet 552 being about 3.25 resulted in improved cooing of the CVT 358. In one example, the temperature of CVT 358 during operation is about 250-270 degrees Fahrenheit.

While this invention has been described as having an exemplary design, the present invention may be further modified within the spirit and scope of this disclosure. For example, rather than being a foot well, the floorboard 500 could include an upstanding projection against which a portion of the driver's heel may engage. This projection may be triangular or pyramidal in shape, or may take on other forms. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
a plurality of ground engagement members including at least two front ground engagement members and at least two rear ground engagement members;
a frame supported by the plurality of ground engagement members;
a CVT supported by the frame and contained within a housing;
a prime mover supported by the frame and operatively coupled to at least one of the plurality of ground engagement members through the CVT to power movement of the vehicle;
an operator area supported by the frame and positioned between the at least two front ground engagement members and the at least two rear ground engagement members, the operator area including side by side seating, steering controls operatively coupled to at least a portion of the plurality of ground engagement members, prime mover controls operatively coupled to the prime mover, the operator area including a wall positioned adjacent to and below the seating and forward of the prime mover; and
a CVT cooling system being in fluid communication with an interior of the housing and having an air inlet positioned forward of the CVT and adjacent the wall to draw air from the operator area through the wall and to the interior of the housing and an exhaust duct in fluid communication with the housing and including an air outlet positioned rearward of the air inlet, the air inlet positioned to draw air through the wall below the seating.

2. The vehicle of claim 1, wherein the air inlet of the CVT cooling system is located below the seating of the operator area.

3. The vehicle of claim 2, wherein the air inlet is generally aligned with a front plane of the seating.

4. The vehicle of claim 1, wherein the air inlet is provided in a inlet housing which is coupled to the wall of the operator area, the wall having at least one opening positioned proximate the inlet housing such that air from the operator area passes through the at least one opening and the air inlet into the inlet housing.

5. The vehicle of claim 1, wherein the air outlet of the exhaust duct is positioned lower than the air inlet of the CVT cooling system.

6. The vehicle of claim 1, wherein a length of the CVT cooling system is about 3.25 feet from the air inlet to the interior of the housing.

7. The vehicle of claim 1, wherein a length of the CVT cooling system is up to about 3.25 feet from the air inlet to the interior of the housing.

8. A vehicle, comprising:
a plurality of ground engagement members including at least two front ground engagement members and at least two rear ground engagement members;
a frame supported by the plurality of ground engagement members;
a CVT supported by the frame and contained within a housing;
a prime mover supported by the frame and operatively coupled to at least one of the plurality of ground engagement members through the CVT to power movement of the vehicle;
seating supported by the frame and providing a seating surface for at least two occupants in a side-by-side arrangement, and a wall positioned adjacent to and below the seating and forward of the prime mover
steering controls operatively coupled to at least a portion of the plurality of ground engagement members;
prime mover controls operatively coupled to the prime mover; and
a CVT cooling system being in fluid communication with an interior of the housing and having an air inlet positioned lower than the seating and generally aligned with a front plane of the seating, the air inlet being positioned to draw air through the wall below the seating.

9. The vehicle of claim 8, wherein the air inlet is provided in a inlet housing which is coupled to a wall positioned beneath the seating, the inlet housing being positioned directly below the seating, the wall having at least one opening positioned proximate the inlet housing such that air passes through the at least one opening and the air inlet into the inlet housing.

10. The vehicle of claim 8, wherein air traveling from the air inlet of the cooling system to the interior of the housing travels up to about 3.25 feet.

11. A method of cooling a CVT of a utility vehicle which includes an operator area, the method comprising the steps of:
providing the operator area with side by side seating and a wall positioned adjacent to and below the seating;
providing at least one opening through the wall, the opening positioned below the seating;
positioning the CVT within a housing;

providing a cooling system having a fluid inlet and a fluid conduit, an interior of the housing being in fluid communication with the fluid conduit of the cooling system;

positioning the fluid inlet adjacent the opening to draw air through the opening from the operator area into the fluid conduit of the cooling system; and positioning an exhaust in fluid communication with the housing and including an air outlet positioned such that the air outlet does not exhaust into the air inlet.

12. The method of claim 11, wherein the air inlet is provided in an inlet housing, an interior of which is in fluid communication with the fluid conduit of the cooling system.

13. The method of claim 12, further comprising the steps of:

positioning the inlet housing below seating provided in the operator area; and coupling the inlet housing to a wall of the operator area.

14. The method of claim 13, wherein the step of coupling the inlet housing to the wall includes the steps of positioning tabs of the inlet housing in corresponding openings of the wall; and securing the inlet housing to wall with fasteners.

15. The method of claim 11, further comprising the step of positioning the fluid inlet such that the fluid inlet intersects a centerline of the utility vehicle.

16. The method of claim 15, further comprising the step of positioning the fluid inlet such that the fluid inlet draws air from an area of the operator area positioned lower than the side by side seating of the operator area.

17. The method of claim 16, wherein the air travels a distance of up to about 3.25 feet from the fluid inlet to a fluid inlet of the housing.

18. The method of claim 11, further comprising the step of positioning the fluid inlet such that the fluid inlet draws air from an area of the operator area positioned lower than the side by side seating of the operator area.

19. The method of claim 18, wherein the air travels a distance of up to about 3.25 feet from the fluid inlet to a fluid inlet of the housing.

20. The method of claim 11, wherein the air travels a distance of up to about 3.25 feet from the fluid inlet to a fluid inlet of the housing.

* * * * *